United States Patent
Abramson et al.

(10) Patent No.: US 7,444,206 B2
(45) Date of Patent: Oct. 28, 2008

(54) ROBOTIC VACUUM CLEANER

(75) Inventors: Shai Abramson, Pardesia (IL); Shalom Levin, Atlit (IL); Ran Zaslavsky, Kfar Saba (IL)

(73) Assignee: F Robotics Acquisitions Ltd., Kadima (IL)

( * ) Notice: Subject to any disclaimer, the term of this patent is extended or adjusted under 35 U.S.C. 154(b) by 0 days.

(21) Appl. No.: 11/487,850

(22) Filed: Jul. 17, 2006

(65) Prior Publication Data

US 2007/0100500 A1    May 3, 2007

Related U.S. Application Data

(63) Continuation of application No. 10/360,092, filed on Feb. 7, 2003, now Pat. No. 7,079,923, which is a continuation of application No. 10/007,103, filed on Dec. 4, 2001, now Pat. No. 7,167,775.

(30) Foreign Application Priority Data

Sep. 26, 2001    (IL) ..................................... 145680

(51) Int. Cl.
    *G06F 19/00* (2006.01)
(52) U.S. Cl. ........................ 700/245; 700/258; 700/259; 180/5.6; 180/167; 180/169; 318/568.12; 318/581; 318/587; 340/988; 701/23; 701/24; 701/25
(58) Field of Classification Search ................. 700/245, 700/258, 259; 180/6.5, 167, 169; 318/568.12, 318/581, 587; 340/988; 701/23, 24, 25
See application file for complete search history.

(56) References Cited

U.S. PATENT DOCUMENTS

| 4,219,092 A | 8/1980 | Richter |
| 4,397,372 A | 8/1983 | De Kraker |
| 4,420,651 A | 12/1983 | Teich |
| 4,503,581 A | 3/1985 | Early |
| 4,580,766 A | 4/1986 | Woodgate |
| 4,596,412 A | 6/1986 | Everett et al. |
| 4,638,445 A | 1/1987 | Mattaboni |
| 4,706,327 A | 11/1987 | Getz et al. |
| 4,754,520 A | 7/1988 | Steadings et al. |
| 4,846,297 A | 7/1989 | Field et al. |

(Continued)

FOREIGN PATENT DOCUMENTS

JP    404295323    10/1992

(Continued)

OTHER PUBLICATIONS

EPO Search Report For corresponding EP Application No. 02775174.2 based on PCT/IL2002/00788, dated Mar. 26, 2007.

(Continued)

*Primary Examiner*—Khoi H. Tran
*Assistant Examiner*—Marc McDieunel
(74) *Attorney, Agent, or Firm*—Lathrop & Gage

(57) ABSTRACT

An autonomous robot, that is for example, suitable for operations such as vacuuming and surface cleaning includes a payload configured for vacuum cleaning, a drive system including a steering system, a navigation system, and a control system for integrating operations of the aforementioned systems.

15 Claims, 37 Drawing Sheets

U.S. PATENT DOCUMENTS

| | | | |
|---|---|---|---|
| 4,875,693 A | 10/1989 | Nowak et al. |
| 4,878,003 A | 10/1989 | Knepper |
| 4,942,640 A | 7/1990 | Hayashi et al. |
| 4,964,190 A | 10/1990 | Murata et al. |
| 4,977,639 A | 12/1990 | Takahashi et al. |
| 5,095,577 A | 3/1992 | Jonas et al. |
| 5,144,715 A | 9/1992 | Matsuyo et al. |
| 5,276,618 A | 1/1994 | Everett, Jr. |
| 5,279,672 A | 1/1994 | Betker et al. |
| 5,284,522 A | 2/1994 | Kobayashi et al. |
| 5,293,955 A | 3/1994 | Lee |
| 5,309,592 A | 5/1994 | Hiratsuka |
| 5,321,614 A | 6/1994 | Ashworth |
| 5,341,540 A | 8/1994 | Soupert et al. |
| 5,353,224 A | 10/1994 | Lee et al. |
| 5,357,432 A | 10/1994 | Margolis et al. |
| 5,363,305 A | 11/1994 | Cox et al. |
| 5,369,347 A | 11/1994 | Yoo |
| 5,402,051 A | 3/1995 | Fujiwara et al. |
| 5,414,625 A | 5/1995 | Hattori |
| 5,432,416 A | 7/1995 | Tae-Sig |
| 5,440,216 A | 8/1995 | Kim |
| 5,444,893 A | 8/1995 | Hwang et al. |
| 5,499,425 A | 3/1996 | Glenn, III |
| 5,525,883 A | 6/1996 | Avitzour |
| 5,534,762 A | 7/1996 | Kim |
| 5,548,511 A | 8/1996 | Bancroft |
| 5,559,696 A | 9/1996 | Borenstein |
| 5,568,589 A | 10/1996 | Hwang |
| 5,621,291 A | 4/1997 | Lee |
| 5,634,237 A | 6/1997 | Paranjpe |
| 5,657,225 A | 8/1997 | Bauer |
| 5,682,640 A | 11/1997 | Han |
| 5,684,695 A | 11/1997 | Bauer |
| 5,687,294 A | 11/1997 | Jeong |
| 5,709,007 A | 1/1998 | Chiang |
| 5,719,762 A | 2/1998 | Kanayama |
| 5,741,118 A | 4/1998 | Shinbara et al. |
| 5,758,298 A | 5/1998 | Guldner |
| 5,764,014 A | 6/1998 | Jakeway et al. |
| 5,781,960 A | 7/1998 | Kilstrom et al. |
| 5,787,545 A | 8/1998 | Colens |
| 5,794,166 A | 8/1998 | Bauer et al. |
| 5,815,880 A | 10/1998 | Nakanishi |
| 5,841,259 A | 11/1998 | Kim et al. |
| 5,867,800 A | 2/1999 | Leif |
| 5,870,315 A | 2/1999 | January |
| 5,906,024 A | 5/1999 | Jailor et al. |
| 5,916,285 A | 6/1999 | Alofs et al. |
| 5,926,909 A | 7/1999 | McGee |
| 5,935,179 A | 8/1999 | Kleiner et al. |
| 5,940,927 A | 8/1999 | Haegermarck et al. |
| 5,956,250 A | 9/1999 | Gudat et al. |
| 5,957,984 A | 9/1999 | Rencken |
| 5,959,423 A | 9/1999 | Nakanishi et al. |
| 5,995,883 A | 11/1999 | Nishikado |
| 5,995,884 A | 11/1999 | Allen et al. |
| 6,028,672 A | 2/2000 | Geng |
| 6,076,226 A | 6/2000 | Reed |
| 6,076,227 A | 6/2000 | Schallig et al. |
| 6,076,230 A | 6/2000 | Harsh |
| 6,079,862 A | 6/2000 | Kawashima et al. |
| 6,105,202 A | 8/2000 | Grasso et al. |
| 6,119,057 A | 9/2000 | Kawagoe |
| 6,123,779 A | 9/2000 | Conrad et al. |
| 6,124,694 A | 9/2000 | Bancroft et al. |
| 6,138,063 A | 10/2000 | Himeda |
| 6,205,380 B1 | 3/2001 | Bauer et al. |
| 6,278,917 B1 | 8/2001 | Bauer et al. |
| 6,338,013 B1 | 1/2002 | Ruffner |
| 6,339,735 B1 | 1/2002 | Peless et al. |
| 6,389,329 B1 | 5/2002 | Colens |
| 6,443,509 B1 | 9/2002 | Levin et al. |
| 6,459,955 B1 * | 10/2002 | Bartsch et al. ............... 700/245 |
| 6,493,612 B1 | 12/2002 | Bisset et al. |
| 6,532,404 B2 | 3/2003 | Colens |
| 6,615,108 B1 | 9/2003 | Peless et al. |
| 6,690,134 B1 | 2/2004 | Jones et al. |
| 7,079,923 B2 * | 7/2006 | Abramson et al. .......... 700/245 |
| 7,113,847 B2 * | 9/2006 | Chmura et al. ............. 700/245 |
| 7,167,775 B2 * | 1/2007 | Abramson et al. .......... 700/245 |
| 2001/0047231 A1 | 11/2001 | Peless et al. |
| 2002/0016649 A1 | 2/2002 | Jones |
| 2002/0120364 A1 | 8/2002 | Colens |
| 2002/0156556 A1 | 10/2002 | Ruffner |
| 2003/0025472 A1 | 2/2003 | Jones et al. |

FOREIGN PATENT DOCUMENTS

| | | |
|---|---|---|
| WO | WO 00/36962 | 3/2000 |
| WO | WO 00/36961 | 6/2000 |
| WO | WO 00/36965 | 6/2000 |
| WO | WO 00/36969 | 6/2000 |
| WO | WO 00/36970 | 6/2000 |
| WO | WO 00/38025 | 6/2000 |
| WO | WO 00/38027 | 6/2000 |
| WO | WO 00/38028 | 6/2000 |
| WO | WO 00/38029 | 6/2000 |
| WO | WO 00/38255 | 6/2000 |
| WO | WO 00/73867 A1 | 12/2000 |
| WO | WO 01/01208 A1 | 1/2001 |
| WO | WO 01/06904 A1 | 2/2001 |
| WO | WO 01-08544 A1 | 2/2001 |

OTHER PUBLICATIONS

Hinkel et al., An application for a distributed computer architecture—Realtime data processing in an autonomous mobile robot, 1988, The 8th International Conference on Distributed Computing Systems, San Jose, California, see entire document.

U.S. Appl. No. 60/297,718, filed Jun. 12, 2001, Joseph L. Jones.

Okhotsimsky, et al., Development of a robotic assembly complex, 1992 IEEE International Conference on May 12-14, 1992, pp. 1122-1125 vol. 2.

* cited by examiner

ROBOTIC VACUUM CLEANER

RELATED APPLICATIONS

This application is a continuation of U.S. patent application Ser. No. 10/360,092, filed Feb. 7, 2003, now, U.S. Pat. No. 7,079,923, which is a continuation of U.S. patent application Ser. No. 10/007,103, filed Dec. 4, 2001, now, U.S. Pat. No. 7,167,775. The aforementioned applications are incorporated by reference in their entirety herein.

TECHNICAL FIELD

The present invention is related to robotic and other automated devices and in particular to robotic and automated vacuum cleaning and other similar devices.

BACKGROUND

Robotics is a rapidly advancing field of technology. Today, for example, robots appear in manufacturing production lines, operating rooms, swimming pools, and warehouses. With the advance of this technology, robots are and will continue to perform more tasks that were one thought to be only performable by humans.

However, one factor limiting the development of mobile robots is their ability to move freely, absent motion restrictors such as tracks, guides, rails or the like, within a closed or working area, while providing complete coverage over portions of the closed or working area. Moreover, work over these desired or needed areas should be in an efficient manner, with some control over the travel path, so as not to be repetitious or random, and therefore, wasteful of energy.

Motion restrictive mechanisms, such as tracks, guides, rails or the like are disadvantageous, as they are unaesthetic, and expensive to install and maintain. Additionally, they present a workplace and/or pedestrian hazard, as they protrude from, or are indented, into floors or the like. This may lead to injuries, should a person not be mindful of them.

Another limiting factor is that robots for area coverage required boundaries, so as not to operate in undesired areas. These boundaries have been either tracks, rails, guides, or other motion restrictors, whose disadvantages have been detailed above, or markers, typically in the form of signs or other mechanisms, protruding from the ground, walls or ceilings, that also present safety hazards as detailed above. Moreover, these signs or other boundary mechanisms are expensive to install and maintain, as they must be precisely positioned and constantly watched by workers to maintain the integrity of the boundaries.

Additionally, it is desired to extend the uses of robots from commercial uses, as detailed above, to domestic uses. In doing so, the person who employs these domestic use robots will have increased free or leisure time, as they will be free from performing domestic tasks. One such robot is disclosed in commonly owned U.S. Pat. No. 6,255,793, that is incorporated by reference herein.

SUMMARY

The present invention improves on the contemporary art by providing systems and methods for operating an autonomous machine, typically a robot, for performing tasks, for example, vacuum cleaning. The apparatus of the present invention includes embodiments in the form of autonomous robots adapted for indoor or confined area coverage, that can be placed in a position within a room or the like and activated, such that the entire room will ultimately be covered and, for example, be vacuumed, surface cleaned or the like. These embodiments can function in ordinary rooms or areas with minimal, if any, room set up or preparation time. The apparatus can move between various surfaces, such as hard floors and carpets, without human intervention to change brushes, nozzles or the like. Additionally, these embodiments can avoid obstacles and cover the room or designated area with minimal repetition from predetermined amounts of energy.

An embodiment of the invention includes an apparatus for autonomous vacuum cleaning comprising, a payload configured for vacuum cleaning, a drive system including a steering system, a navigation system, and a control system. The control system includes a processor, e.g., a microprocessor, that is configured for integrating operations of the payload, drive system and navigation system.

Another embodiment of the invention is directed to an apparatus for autonomous operation over an area comprising a drive system and a controller in communication with the drive system. This controller includes a processor, for example, a microprocessor, programmed to: provide at least one scanning pattern for a first portion of the area; analyze the first portion for an opening to a second portion of the area; and signal the drive system to move along a path at least proximate the periphery of the first portion to and through the opening to the second area.

Another embodiment is directed to an apparatus for autonomous operation over an area comprising a drive system and a controller in communication with the drive system. The controller includes a processor, for example, a microprocessor, programmed to: provide at least one scanning pattern for a portion of the area from a first point; signal the drive system to move along a path at least proximate the periphery of the scanned portion to a second point, the second point at a different location than the first point; and provide at least one scanning pattern for a portion of the area from the second point.

Another embodiment is directed to a method for area coverage by an autonomous machine, such as a robot or the like. This method includes scanning a first portion of the area in accordance with at least one scanning pattern, analyzing this first portion for an opening to a second portion of the area, and moving along a path at least proximate to the periphery of the first portion to and through the opening to a second portion of the area.

Another embodiment is directed to a method for area coverage by an autonomous machine, such as a robot or the like. This method includes scanning a portion of the area in accordance with at least one scanning pattern, from a first point; moving along a path at least proximate the periphery of the scanned portion to a second point, the second point at a different location than the first point; and scanning a portion of the area in accordance with at least one scanning pattern, from the second point. In this method moving along the path to the second point can be either a movement of a predetermined length (distance) or the length or distance of travel can be determined dynamically.

BRIEF DESCRIPTION OF THE DRAWINGS

Attention is now directed to the attached drawings, wherein like reference numerals or characters indicate corresponding or like components. In the drawings.

DETAILED DESCRIPTION OF THE DRAWINGS

Figure 1:
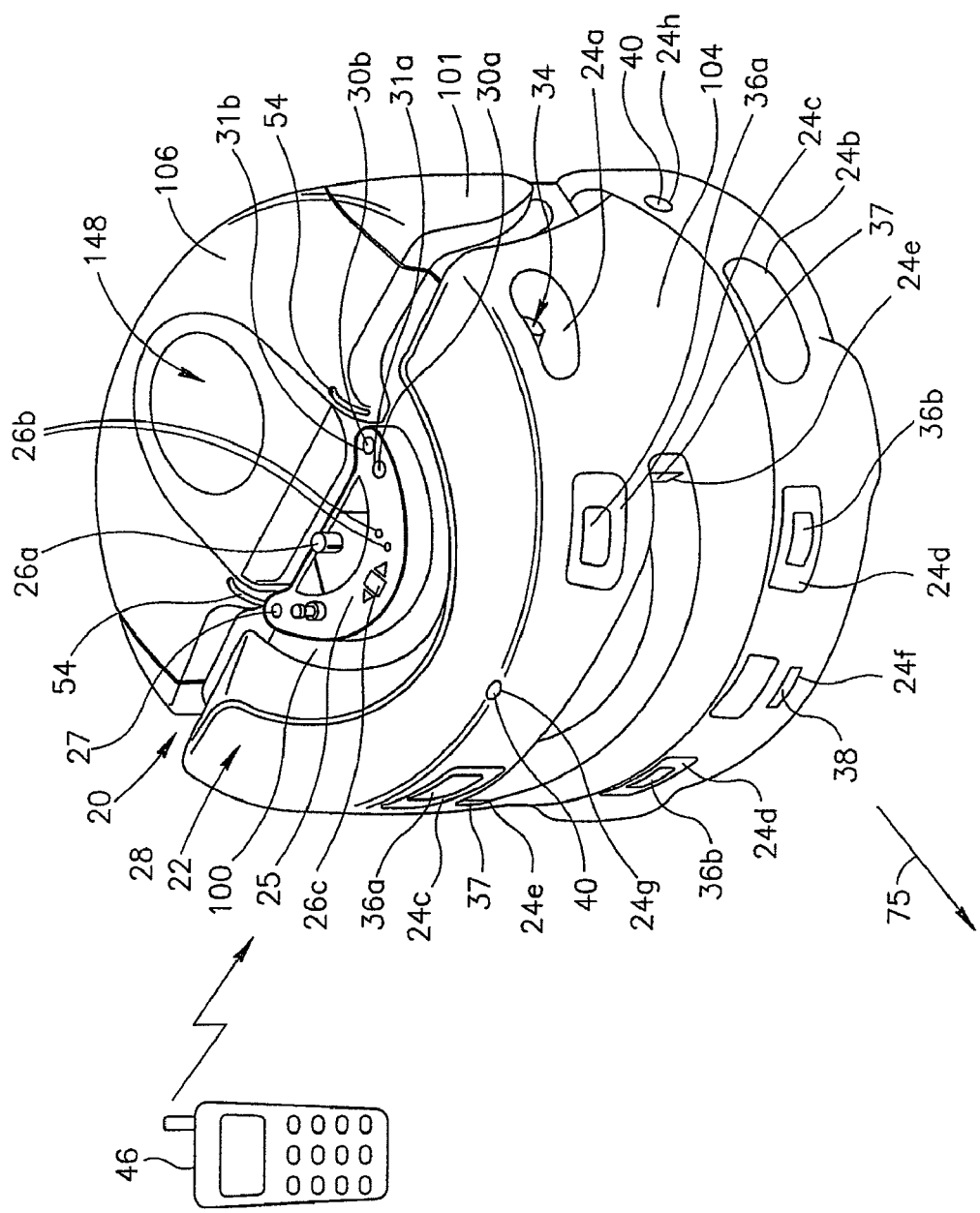
FIG. 1 is a perspective view of the apparatus of an embodiment of the present invention.
Figure 2:
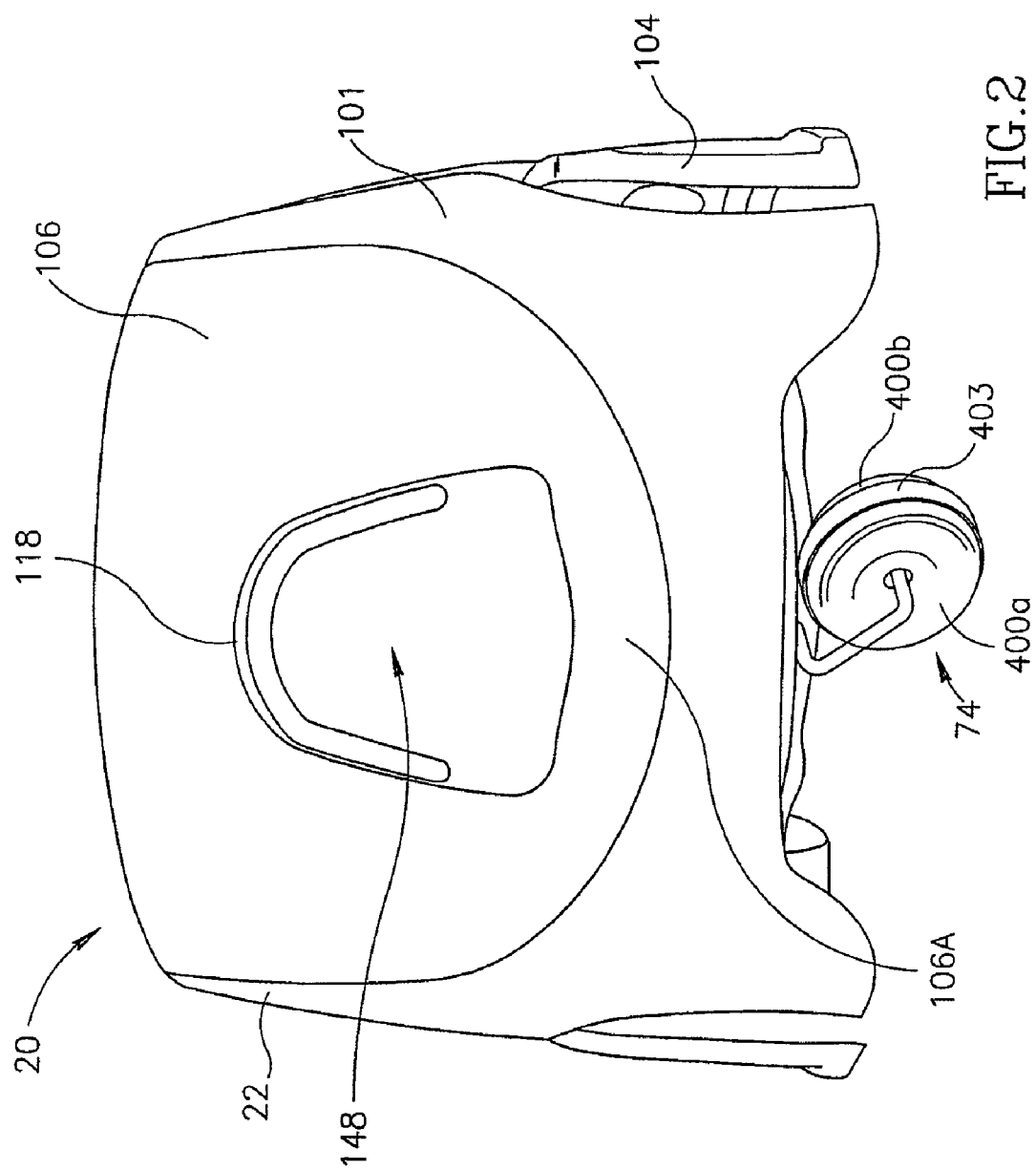
FIG. 2 is a rear view of the apparatus of FIG. 1.
Figure 3A:
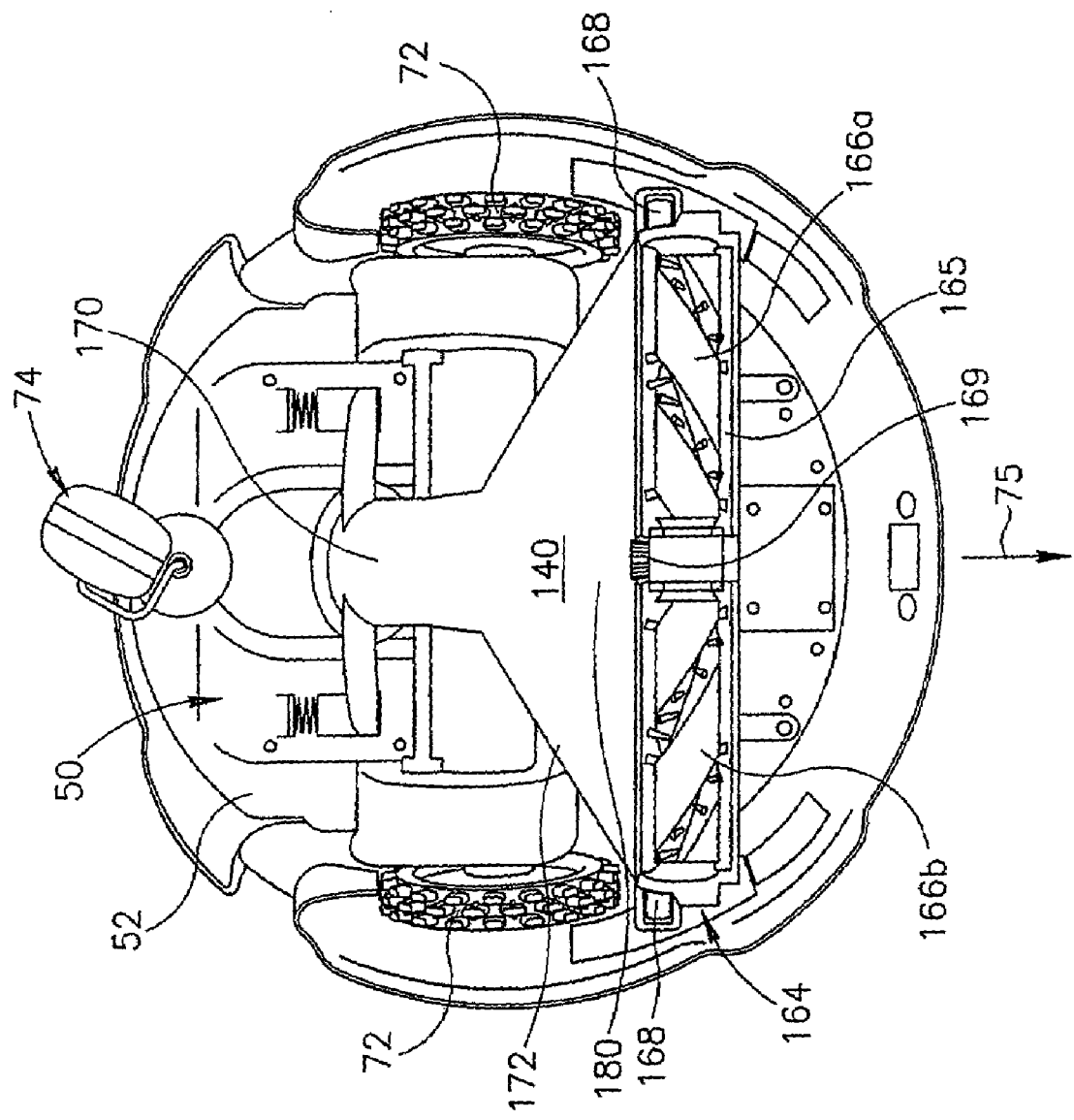
FIG. 3A is a bottom view of the apparatus of FIG. 1.

FIGS. 1, 2 and 3A show the apparatus 20 of the present invention in an exemplary configuration as a robotic vacuum cleaner. The apparatus 20 includes a cover 22, formed of sections 100, 101, 104 and 106 (detailed below), with openings 24a-24g in the bumper section (bumper) 104. There is also a control panel (user interface) 25, supported on the main sections 100, 101. This control panel 25 includes various control knobs 26a, indicators 26b (Light Emitting Diodes (LED) or the like), 26c (LED Display or the like), as well as a socket 27 for receiving a cord (plug end or the like) for charging the apparatus 20 in an electrical outlet or the like. A leash 28 also extends from this control panel 25.

Figure 25:
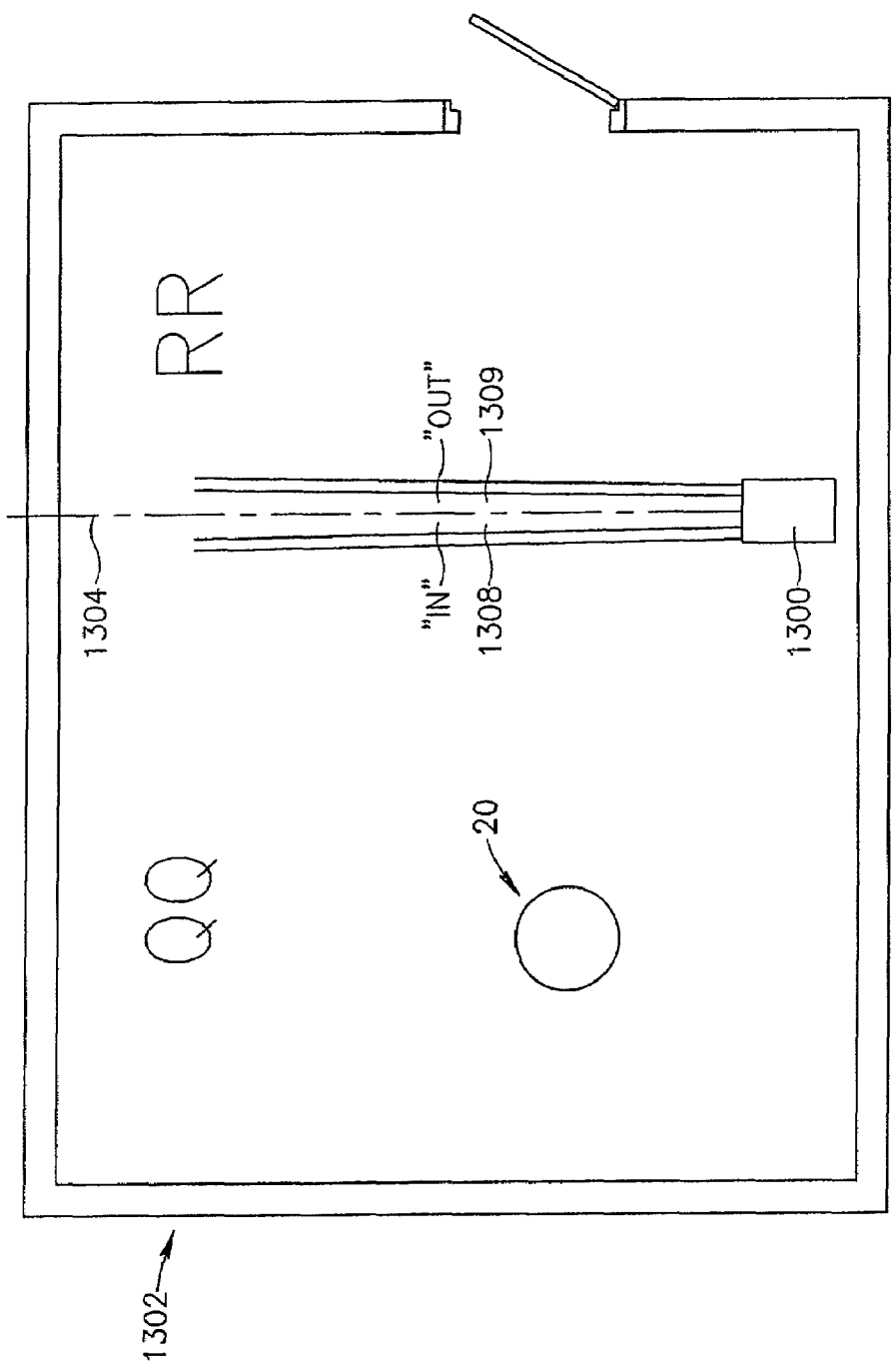
FIG. 25 is a diagram of a system for confining the apparatus in accordance with the present invention.

The apparatus 20 includes sensors, that are part of sensing systems. Door detection sensors 30a, 30b in openings 31a, 31b are on or near the control panel 25 on the upper side of the apparatus 20. The front side of the apparatus 20 includes contour sensors 34, 35 (FIG. 13) for lateral obstacle and wall detection, in openings 24a and 24b (FIG. 13), frontal obstacle detection sensors 36a, 36b in openings 24c and 24d, corner sensors 37, in openings 24e, a shelf detection sensor 38 in opening 24f and remote control sensors 40 in upper opening 24g and lateral openings 24h (see also FIG. 13). These sensors 40 receive signals, typically infrared (IR) light signals, from a remote controller 46 or a coded transmitter 1300, as shown in FIG. 25 and detailed below.

The apparatus 20 is formed of multiple systems, including a power system, drive (motion) system, navigation system, payload, or vacuuming system, bumper system, sensing (including obstacle detecting) systems, all coupled to a control system 1000 (FIG. 23), allowing for autonomous operation. This autonomous operation includes for example, vacuum cleaning or vacuuming, and other surface cleaning operations and movement therefore, by the apparatus 20. The apparatus 20 also includes numerous other systems, shown and detailed below.

Figure 3B:
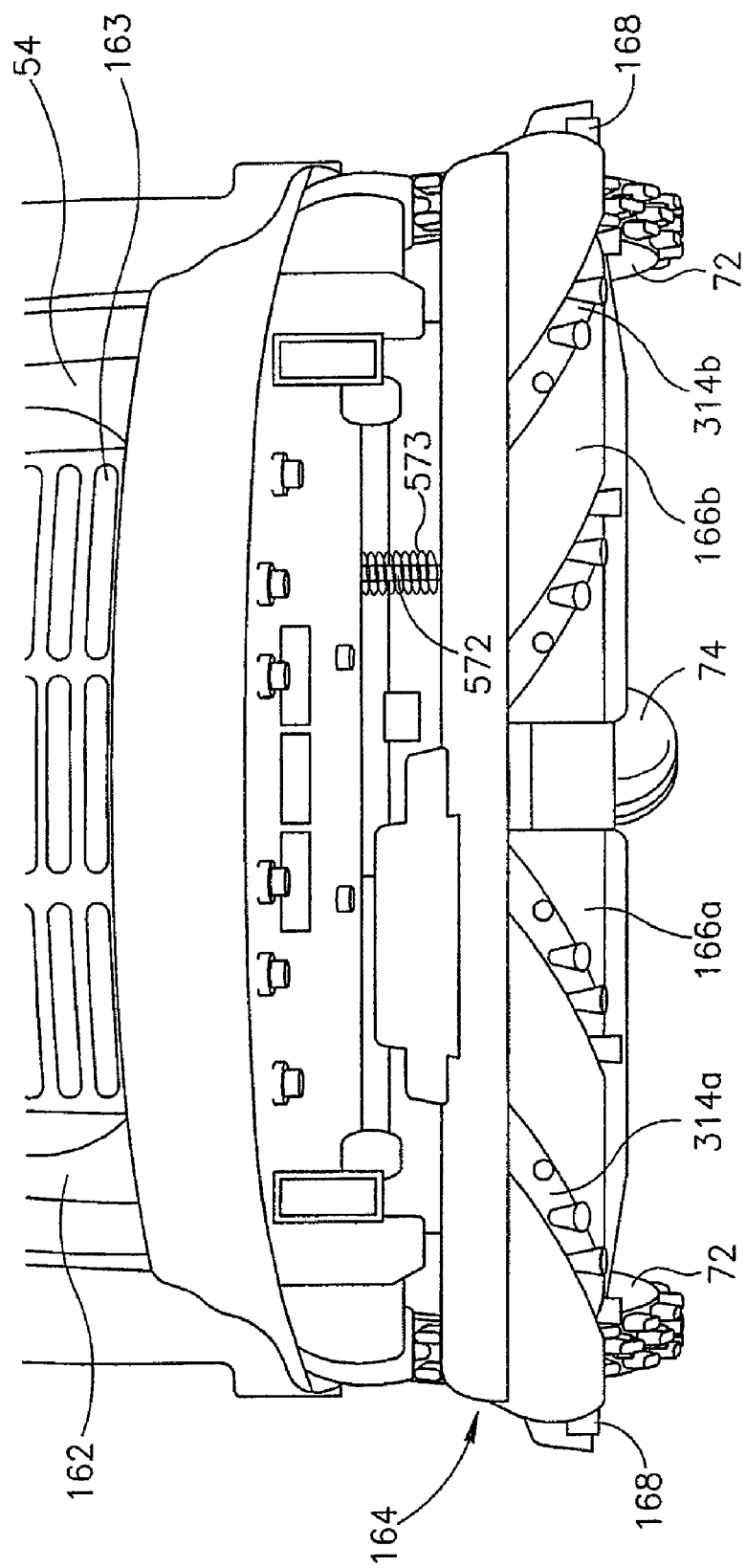
FIG. 3B is a front view of the apparatus of FIG. 1 with the bumper section removed.

Turning also to FIG. 3B, the apparatus 20 is formed of a chassis 50, having a base 52 and an extending portion 54 (FIG. 4), for supporting the components and systems (detailed herein). The chassis 50 rests on drive wheels 72 and a support wheel 74. The drive wheels 72 are typically limited to a single degree of freedom and are "active", with each drive wheel 72 controlled by conventional axial drive mechanisms 73 (motors, etc.—FIG. 19). The support wheel 74, is "passive", and typically has multiple degrees of freedom, as it is used for position, distance and orientation control of the apparatus 20 (shown in FIG. 16 and detailed below). This support wheel 74 is for example, a castor wheel, as detailed in FIG. 16 below.

Figure 23:
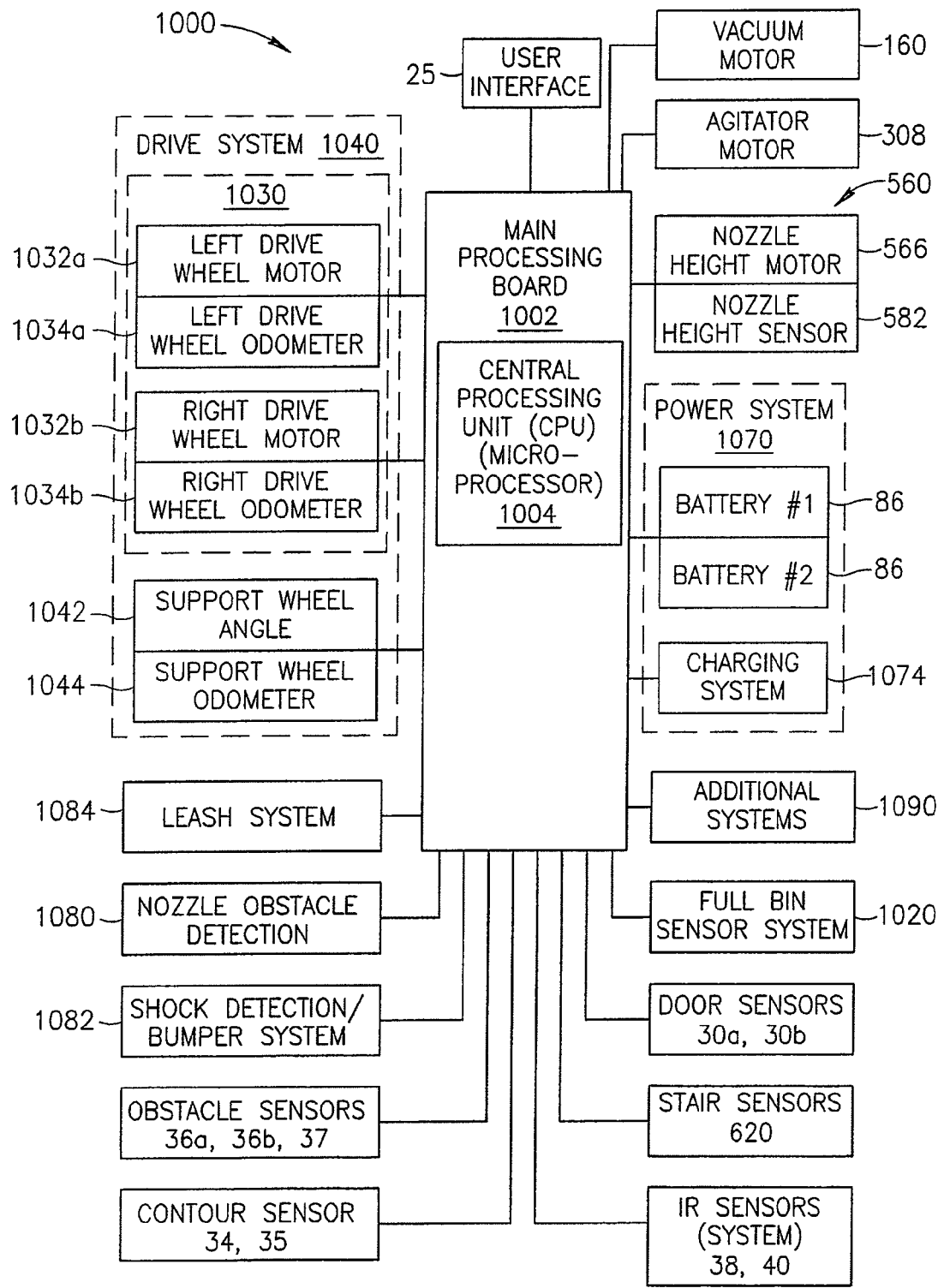
FIG. 23 is a schematic diagram of the control system for the apparatus of the invention.

In normal operation, the drive wheels 72 are forward of the support wheel 74, such that the apparatus 20 moves in the direction of the arrow 75, this arrow indicating the "forward" direction. Accordingly, for description purposes of this document, the terms "forward" and "front" will refer to direction or orientation from the support wheel 74 to the drive wheels 72, while the terms "rear" and "backward" will refer to the direction or orientation opposite of arrow 75, the direction from the drive wheels 72 to the support wheel 74 (and associated electronics). Drive wheels 72 are driven independently of each other, so as to allow for steering (turning and directional changes), and define the steering system 1030 (FIG. 23). These drive wheels 72 (forming the steering system 1030) couple with the support wheel 74, to form the drive system 1040 (FIG. 23). The steering system 1030 and drive system 1040 couple with the control system 1000. Additionally, the drive wheels 72 and support wheel 74 couple with the navigation system (processed through the microprocessor 1004 in FIG. 23).

Figure 4:
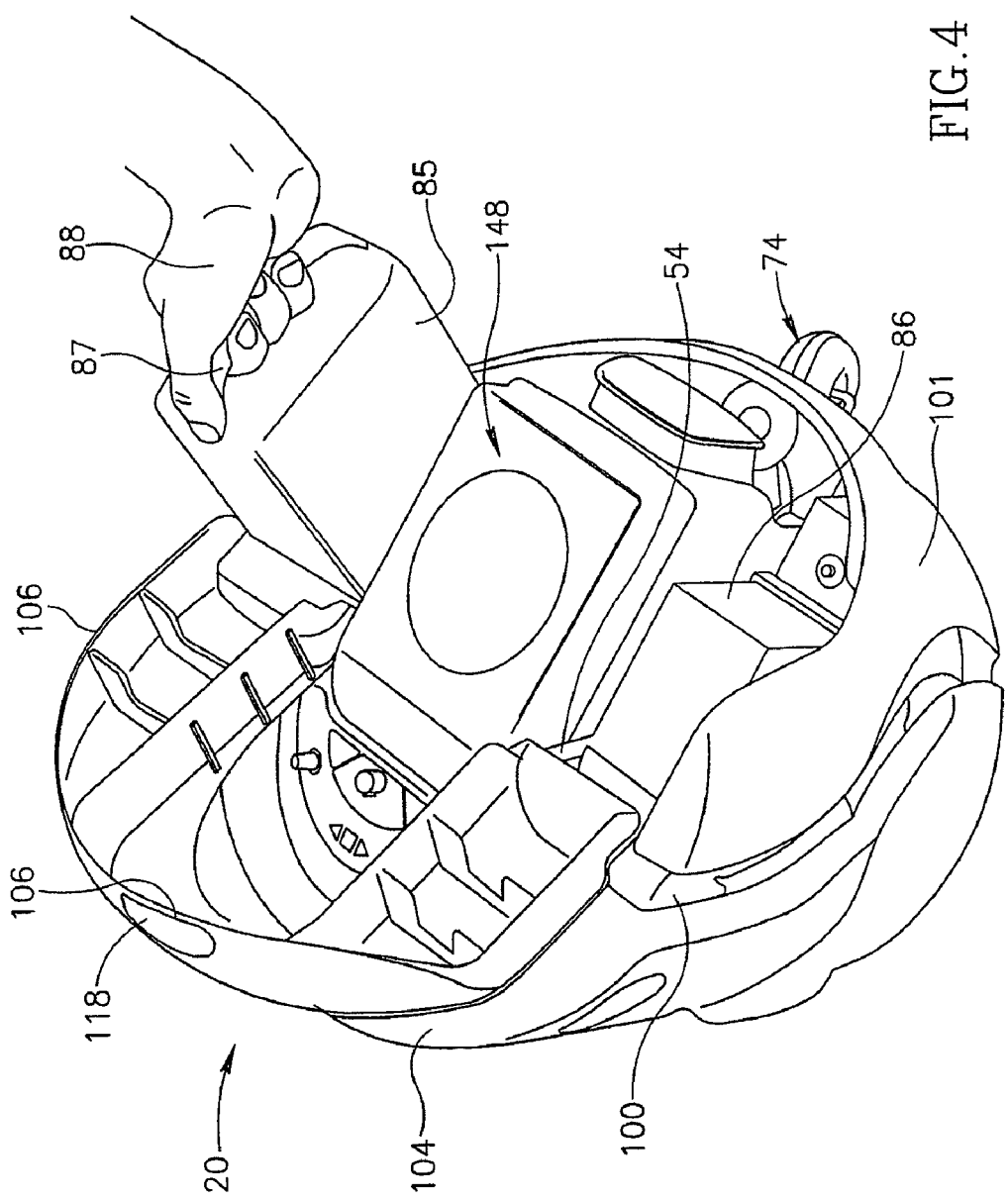
FIG. 4 is a perspective view of the apparatus of FIG. 1 with the handle section lifted.

Turning also to FIG. 4, battery housings 85 (only one shown), envelope batteries 86, typically 12 volt batteries, typically rechargeable, or other similar power source(s) that provide power to the apparatus 20. The battery housings 85 include handles 87, for ease in placement and removal of the batteries 86 (by a user 88) into and out of the apparatus 20.

The housings 85, typically at their bottom sides, include electrical plugs (not shown) for receipt in correspondingly configured sockets (not shown) on the chassis 50, or vice versa, or other suitable paired electrical contacts. The sockets couple with power distribution electronics, to provide power to all components and systems of the apparatus 20, as well as the control system 1000. The batteries 86 and associated electronics and circuitry (detailed above) form the power system 1070 (FIG. 23) for the apparatus 20.

There is also a charging system 1074 (FIG. 23) formed by a charging module (not shown), and associated circuitry. The charging module is electrically coupled to the batteries 86. The charging module is also connected to the socket 27 or port, that can connect with an electrical line, that plugs into a conventional wall socket or the like, to provide electricity to the charging module and ultimately to the batteries.

The cover 22 is typically formed in sections 100, 101, 104, 106. There are two underlying or main sections 100, 101, mounted to the extending portion 54 of the chassis 50 in a fixed manner, overlapped in the front of the apparatus 20 by a bumper section (or bumper) 104 and in the rear of the apparatus 20 by a handle section 106. The handle section 106 includes openings 108, 118 where the filtration unit 148 (FIG. 8) is viewable and a handle 106a is formed from the handle opening 118.

Figure 13:
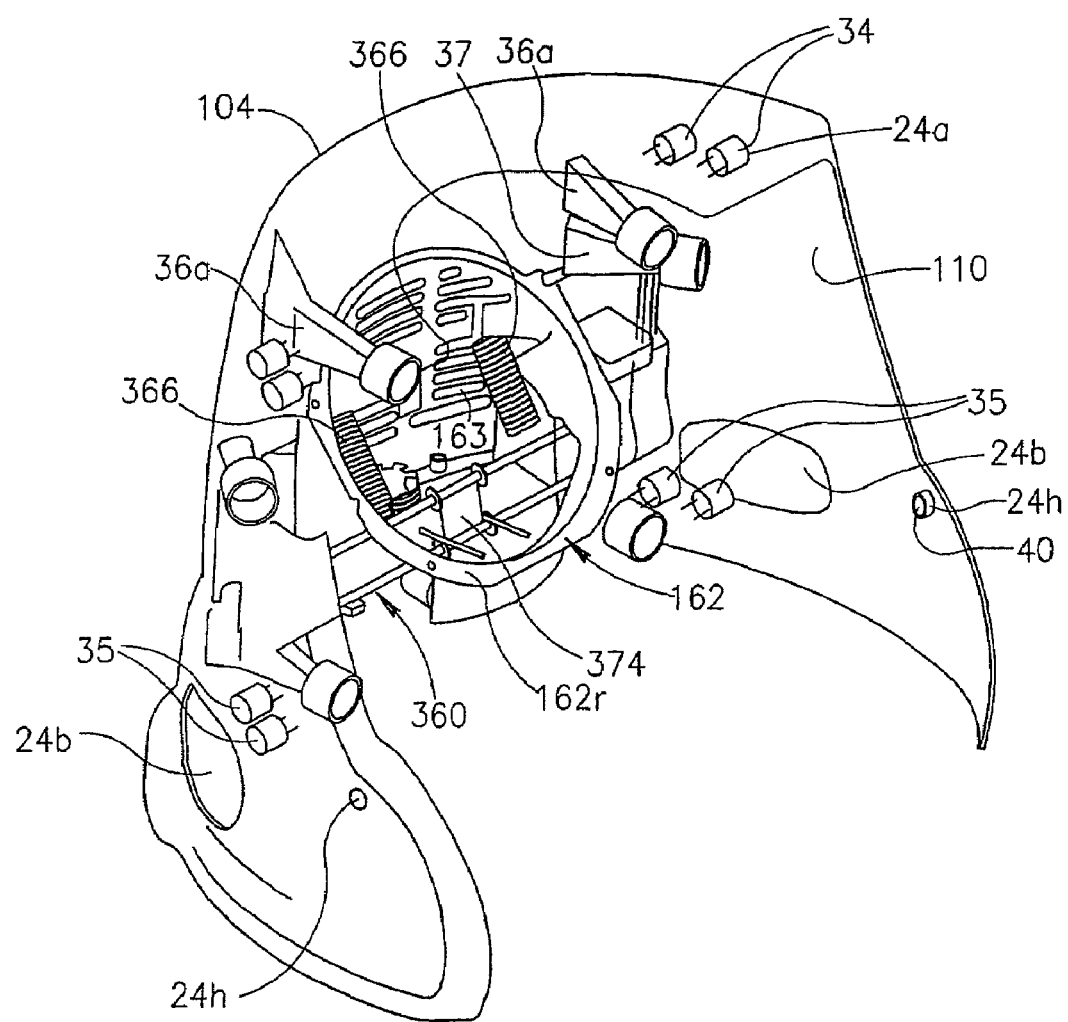
FIG. 13 is a view of the bumper section of the cover and the shock detection system, in accordance with an embodiment of the invention.
Figure 14:
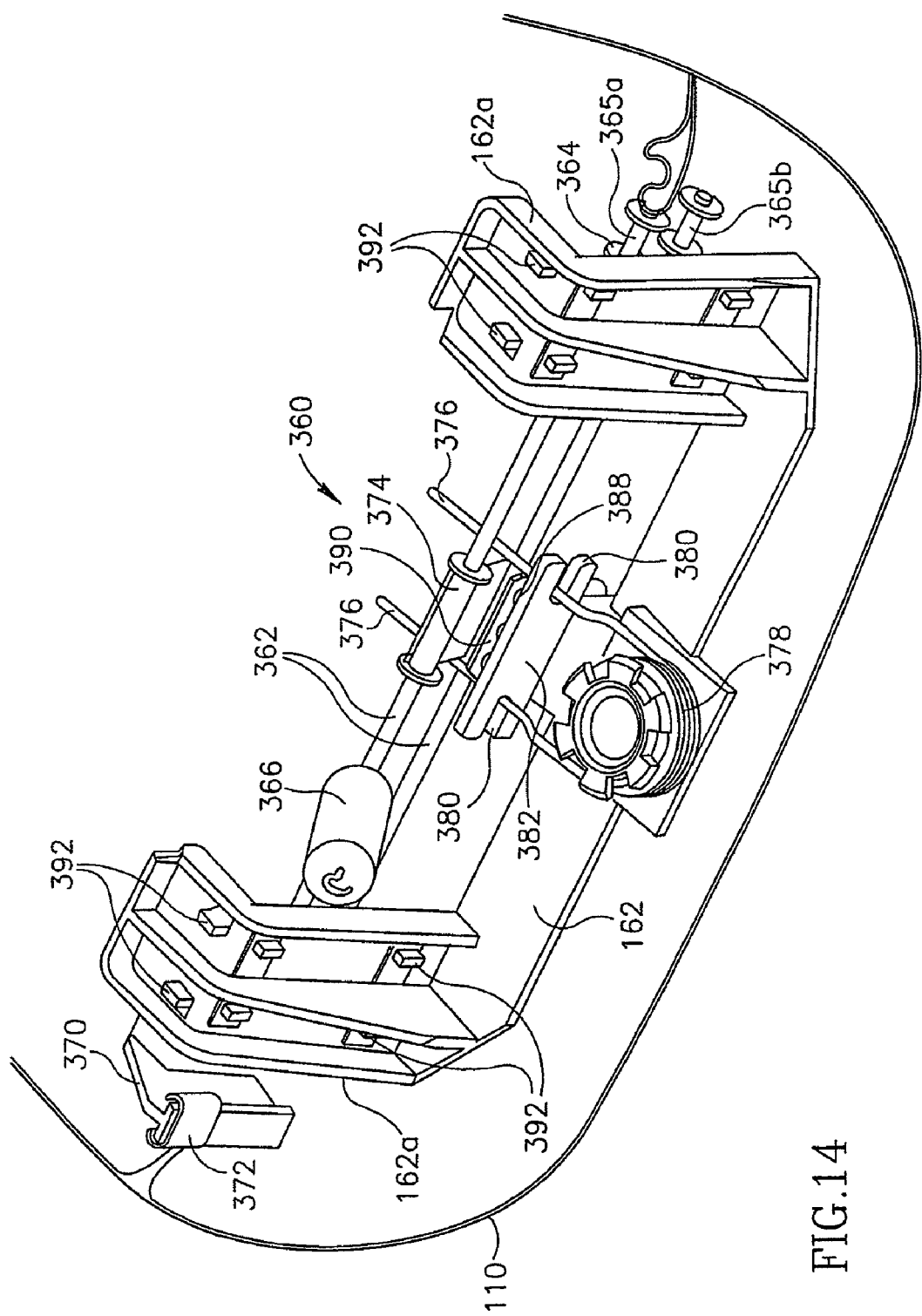
FIG. 14 is a perspective view of the shock detection system of FIG. 13.

The bumper section 104 is pivotally mounted on the apparatus 20 as it mounts (along its inner wall 110) to the bumper member 360, as shown in FIGS. 13 and 14 and detailed below. This mounting suspends the bumper section 104, allowing it to absorb impacts for the apparatus 20. This bumper section 104 covers an arc of approximately 200 degrees (front and sides). Accordingly, this bumper section can handle frontal and lateral impacts to the apparatus 20 as well as impacts from points along the top of the apparatus 20. This bumper section 104 forms part of the shock detection or bumper system 1082 (FIGS. 13, 14 and 23) and detailed below.

The handle section 106 is pivotally mounted to the extending portion 54 of the chassis 50. This section 106 includes an opening 118, that when the apparatus 20 is in a use position, snap-fits into the main section 100. The opening 118 is dimensioned such that the filtration unit 148 (FIG. 8), can be viewed. When the apparatus 20 is in the non-use position, the lower portion of the section 106 is pivoted upward, whereby it is a handle 106a, allowing the apparatus 20 to be carried by the user.

Figure 5A:
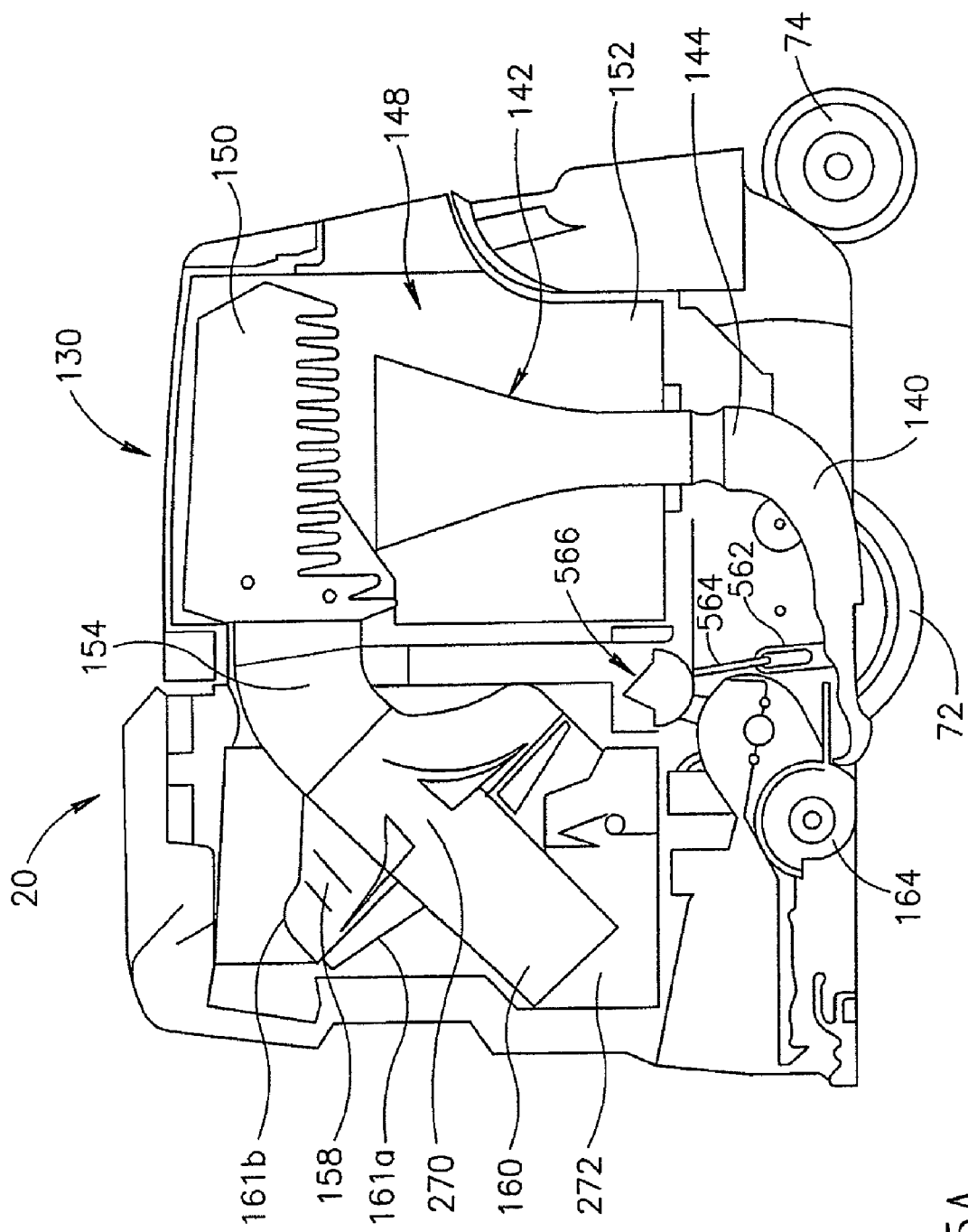
FIG. 5A is a cross section of the apparatus of FIG. 1.
Figure 5B:
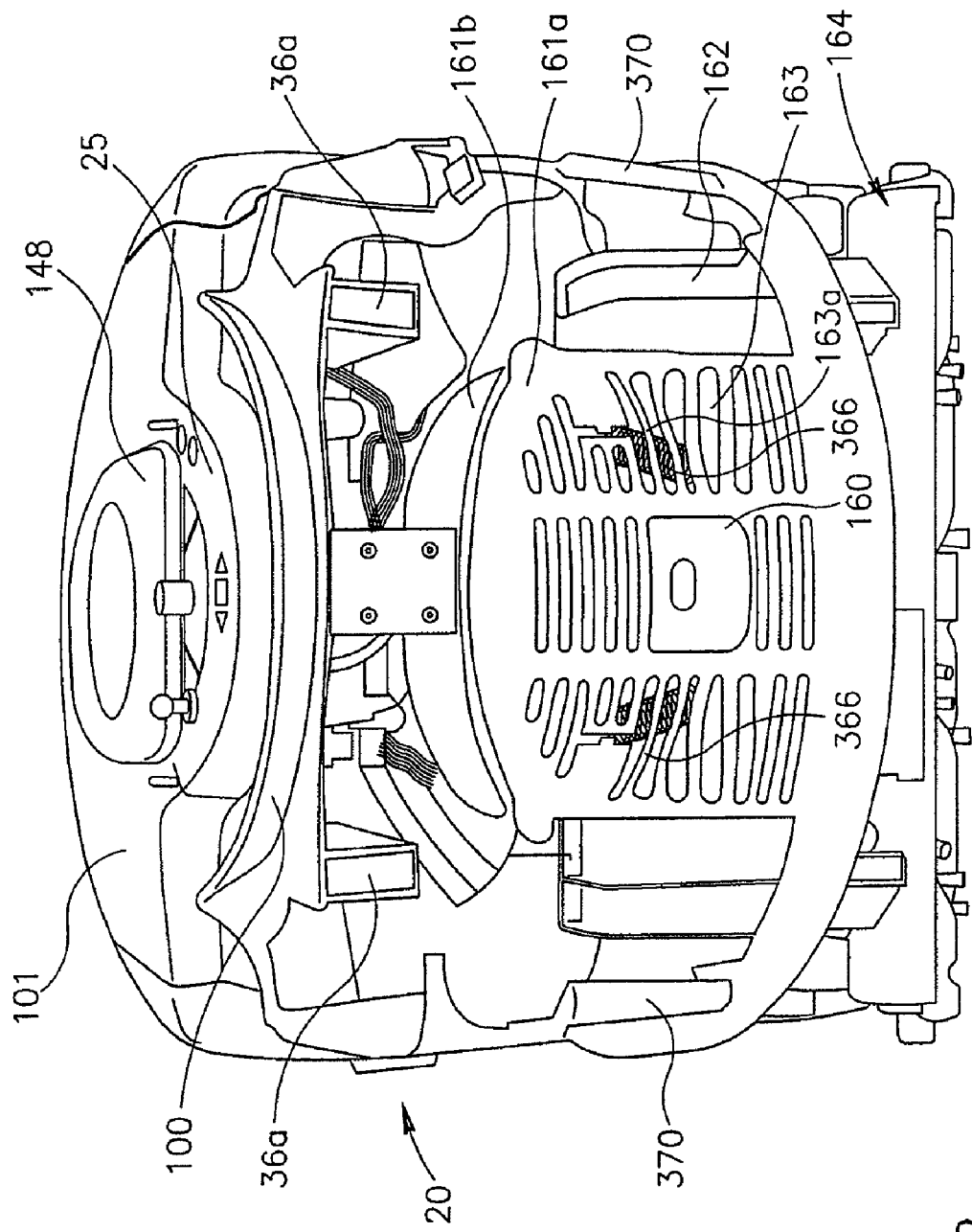
FIG. 5B is a front perspective view of the apparatus of FIG. 1 with the cover section removed.

Turning additionally to FIGS. 5A and 5B, there is detailed the payload 130 of the apparatus 20. The payload 130 will be discussed along with other components from other systems, that are explained herein below. The payload 130, for example, is a vacuum cleaning system, and includes a nozzle 140 that connects to a tube 142, through a duct 144. The tube 142 extends into, and is typically part of, a filtration unit 148 (also in FIG. 3), that includes filter elements 150 and a particle collection area 152.

A conduit 154 connects the filtration unit 148 to an impeller chamber 156, that houses an impeller 158, that is rotated by a motor 160. The impeller chamber 156, that houses the impeller 158 and motor 160, is typically formed of shells 161a, 161b joined by mechanical fasteners, adhesives or other conventional arrangements, and a support member 162 (attached to the chassis 50), along a rim 162r. The support member 162 includes a vent 163, formed of bars 163a, the vent 163 open to the ambient environment. This allows for air intake for suction (in the direction toward the, impeller 158, or downstream for purposes of this document). This arrangement forms a flow path for particles, that is considered to be indirect, since the filtration unit 148 is before the impeller 158, in the particle flow path.

An agitator unit 164 is at the base of the nozzle 140. This agitator unit 164 includes a cover 164a, typically includes a compartment 165 for accommodating rotating members 166a, 166b, and is positioned upstream of the nozzle 140. The rotating members 166a, 166b are typically brushes or the like, whose rotation is controlled by a conventional rotator motor 308. The agitator unit 164 may include rollers 168 or the like for contact with the surface or ground 183, and may be mounted onto the chassis 50 in a manner, so as to contact the ground or surface 183, providing resistance to it, and adjust to various levels in accordance with the contour of the ground or surface. There may also be a static brush portion 169 intermediate the rotating members 166a, 166b.

The cover 164a, for example, at its front, begins at a height hh off of the ground 183 (for example, approximately 2 to 4 cm), exposing the rotating members 166a, 166b, so as to be an "open brush". This "open brush" construction, allows obstacles to be agitated by the rotating members 166a, 166b and suctioned away for enhanced cleaning and obstacle free movement of the apparatus 20. These rotating members 166a, 166b in this construction can assist with drive movements.

Figure 6A:
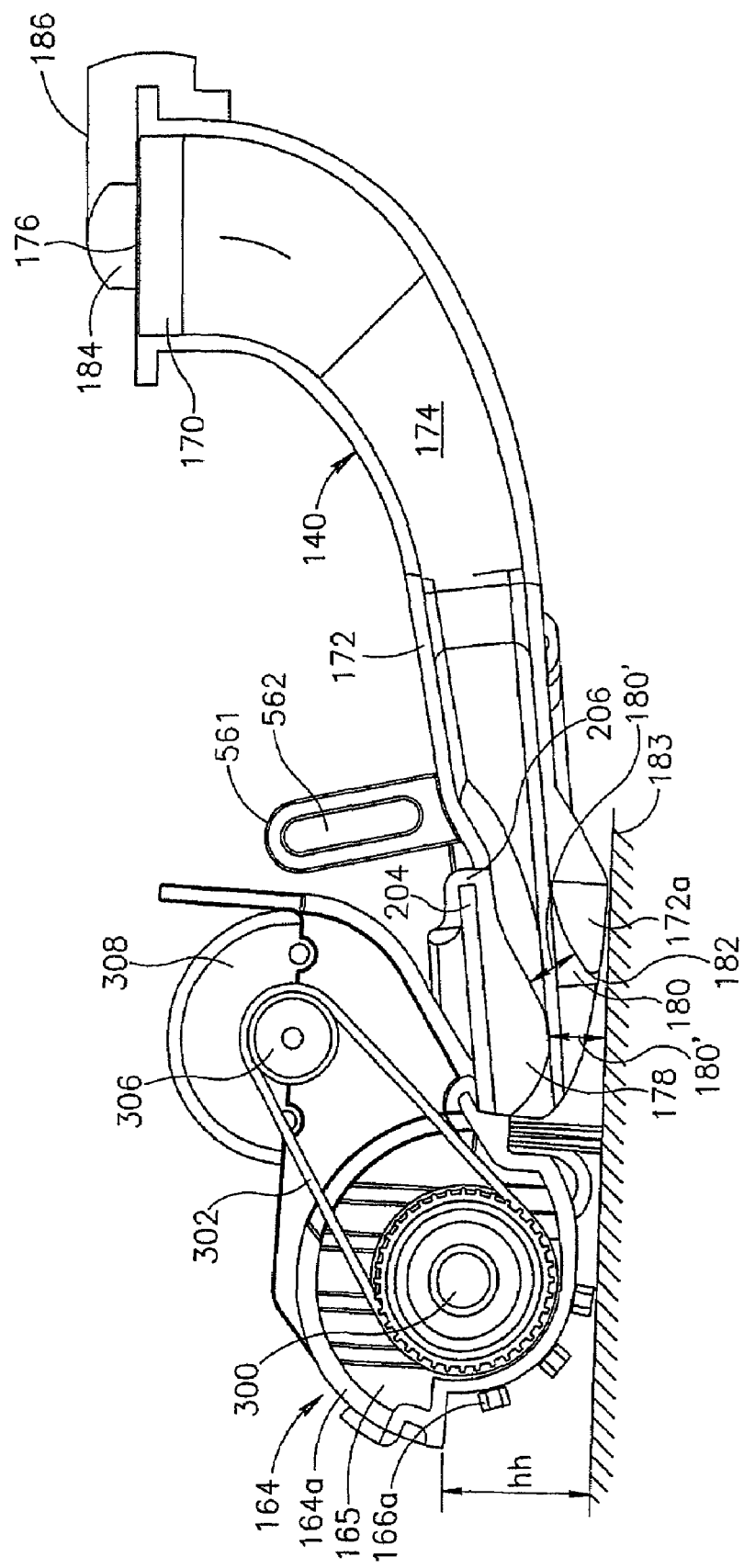
FIG. 6A is a cross sectional view of the nozzle and agitator unit of an embodiment of the present invention.
Figure 6B:
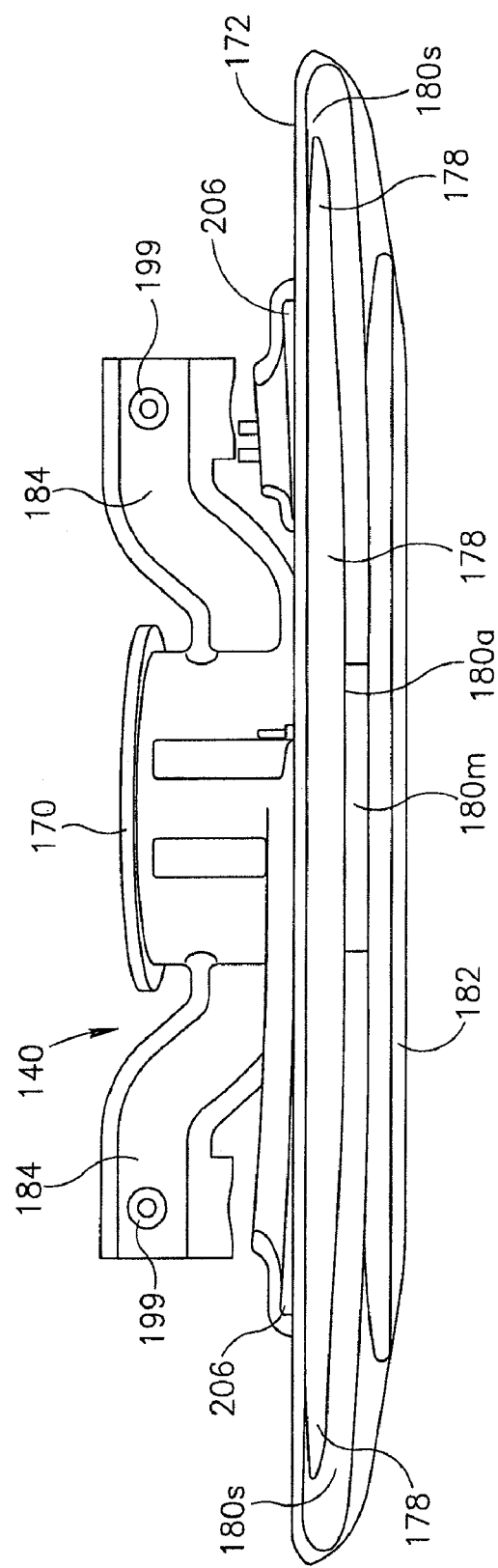
FIG. 6B is a front view of the nozzle of FIG. 6A.

Turning also to FIGS. 6A and 6B, the nozzle 140 includes a neck 170 and a body 172, that form an inner cavity 174 for particles (e.g., debris, etc.) to pass through. At one end, the neck 170 terminates in an opening 176 for attachment to the tube 142 of the filtration unit 148. The other end extends to an outwardly tapered portion of the body 172. The body 172 terminates in a lip 178, that is typically rounded, with an opening 180. This opening 180 includes a first, and typically upper edge 180a, and is narrow at its middle 180m or midsection and wide at the sides 180s, as a result of the tapering (upward, away from the ground 183) of the lip 178, so as to have uniform airflow into the nozzle opening 180.

The body 172 also includes sidewalls 172a, that border a cut-out edge 182. This cut-out edge 182 defines a second, typically lower, edge of the opening 180, and provides for ground clearance and greater maneuverability. The horizontal orientation of the nozzle body 172, coupled with the lip 178 extending beyond the cutout edge 182, allows a flow cavity to be formed with the floor or surface 183. This cavity is of a constant vertical aperture with respect to the opening 180, as indicated by typically equal lengths 180'. This constant vertical aperture maintains acceleration of the airflow into the nozzle opening 180 and nozzle body 172. Additionally, the cavity, coupled with the shape of the rotating members 166a, 166b creates a horizontal acceleration channel with horizontal air flow for particulates (debris, etc.) into the nozzle 140.

Figure 7A:
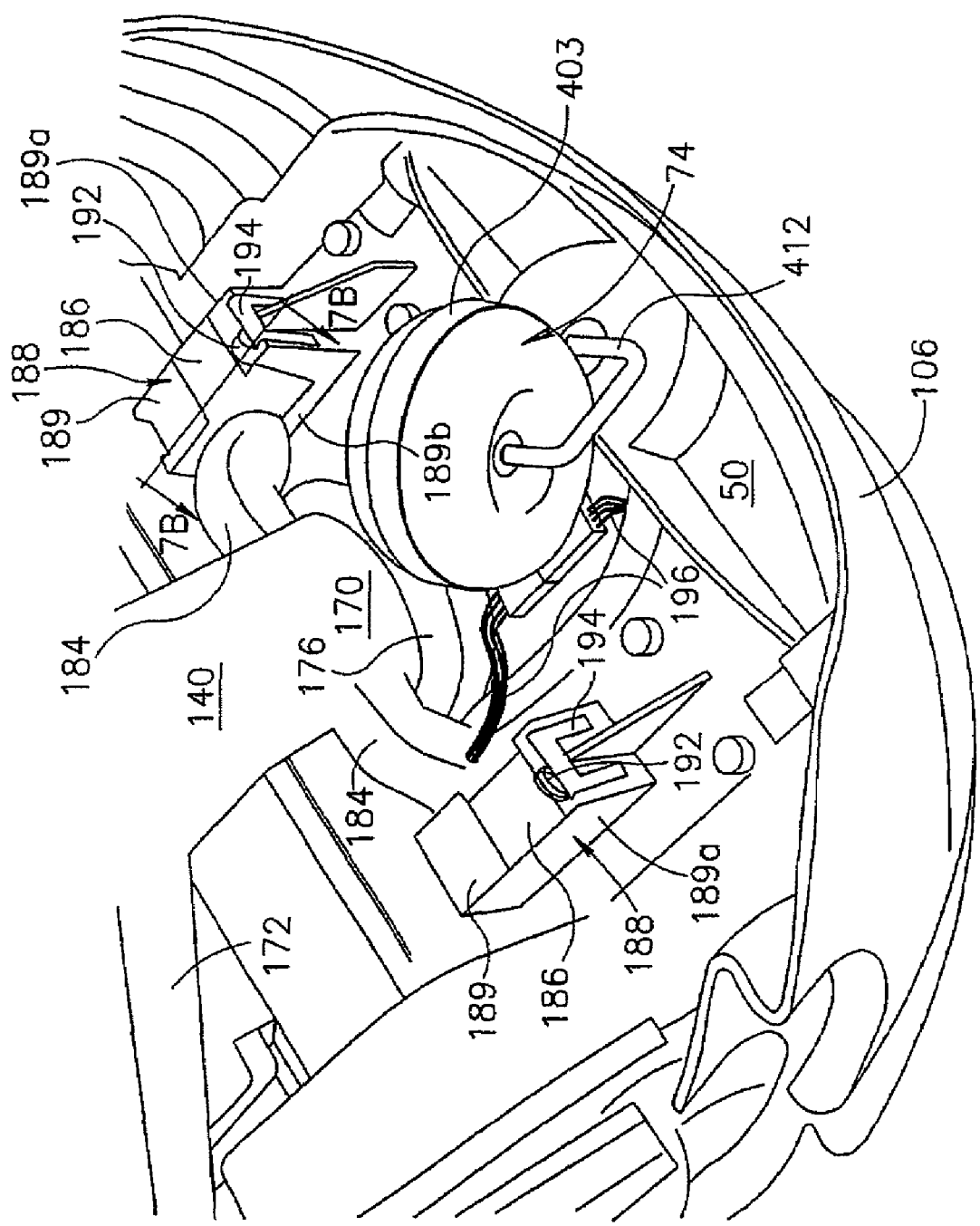
FIG. 7A is a bottom view of the rear portion of the apparatus.
Figure 7B:
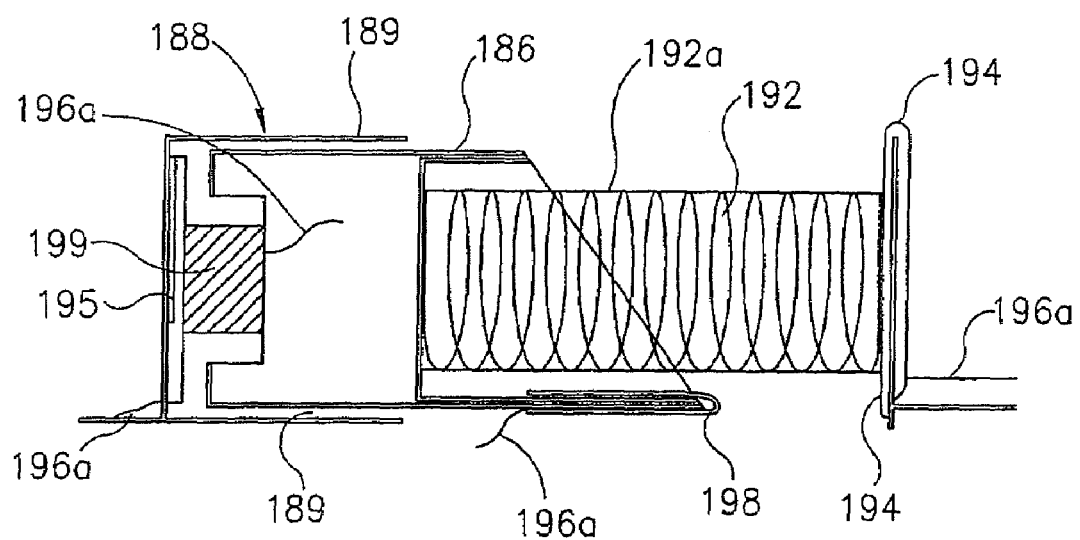
FIG. 7B is a cross-sectional view along line 7B-7B of FIG. 7A.

Turning also to FIGS. 7A and 7B, arms 184 extend laterally from the neck 170 and terminate in blocks 186. The blocks 186 are mounted in boxes 188, with receiving portions 189, outer sidewalls 189a and inner (cut-out) sidewalls 189b. As detailed in FIG. 7B, the blocks 186 are forced into the receiving portions 189 by biasing members (typically flexible), for example, springs 192, that extend inside the blocks 186 and can be covered with an electrically insulative sheath 192a tube or the like, and frictionally retain the blocks 186 in the boxes 188. The springs 192 can also be made of nonconducting material, for example, plastics or non-conducting metals (to avoid a short circuit between the plates 194, 198 and the spring 192, detailed below). This arrangement provides the blocks 186 with the ability for pivotal movement therein, ultimately allowing the nozzle 140 to pivot about the boxes 188.

The boxes 188 include electrical contacts 194, 195, typically metal sheets, plates, or the like, in communication with wiring 196 (from wire leads 196a) linked to the control system 1000. The blocks 186 include a metal plate 198 at one end and a metal stub 199 (also FIG. 6B) at the other end (along the arm 184), also connected by the wiring 196. The plates 194, 198 between the respective boxes 188 and the blocks 186, form "normally open" contacts, while the respective plates 195 of boxes 188, and stubs 199 form "normally closed" contacts. This series of contacts and associated electronics defines a nozzle obstacle detection system 1080 (FIG. 23).

In operation, the open contact (plates 194, 198) and the closed contact (plate 195 and stub 199) are registered with the control system 1000. Should the nozzle 140, upon its movement encounter a hard object, obstacle, or the dragging force becomes too great, the nozzle 140 will move. If the force is great enough, and movement of the nozzle 140 closes any of the normally open contacts, such that the plate 198 physically contacts the plate 194, and/or opens the physical contact between the plate 195 and the stub 199, a signal, typically indicating a closed or open circuit respectively (from the initially open and closed circuits, respectively), will be sent to the control system 1000.

With the requisite signal sent to the control system 1000, the control system 1000 will signal the nozzle/rotating member height mechanism 560, to raise the nozzle 140 (and the rotating members 166a, 166b attached thereto) over the obstacle. With the nozzle 140 and rotating members 166 having cleared the obstacle, travel of the apparatus 20 continues as normal. Alternately, the control system 1000 can be programmed to signal the drive system 1040 to cease operation immediately. (This is also true for other drive system stoppages throughout this document, that are not specifically detailed).

Figure 19:
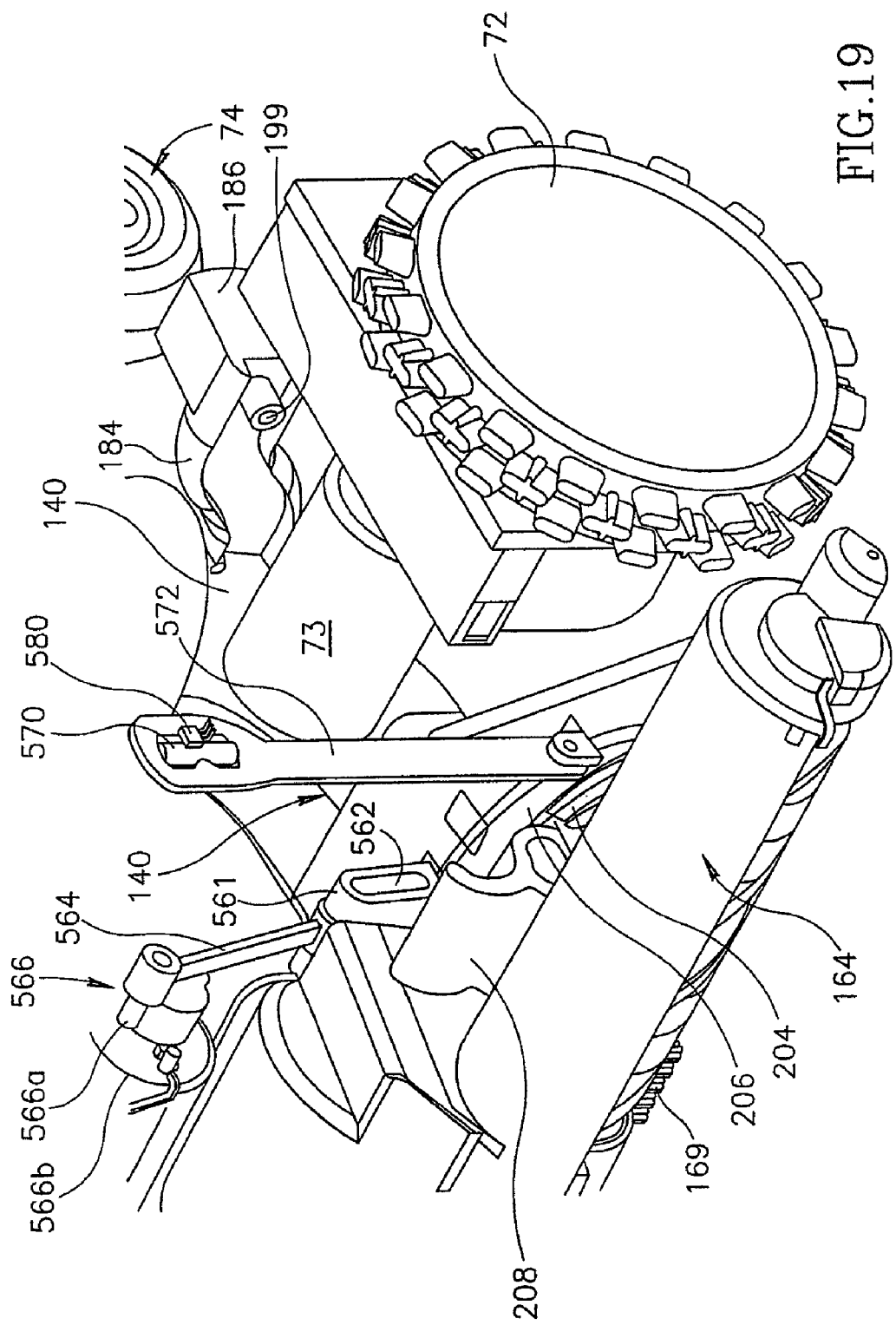
FIG. 19 is a perspective view of the nozzle height adjustment system.

The nozzle 140 is typically made of resilient materials, such as plastic (HDPE, PVC, Nylon, etc.) and is easily separable from both the base 52 of the chassis 50 and the agitator unit 164. The nozzle 140 typically snaps into the base 54 with the agitator unit 164 snapping into the nozzle 140, in a "tools free" manner. For example, the agitator unit 164 snaps into the nozzle 140 as edges 204 of the agitator fit into slots 206 on the nozzle 140 (FIGS. 6A, 6B and 19). This engagement is held together by a resilient clip 208 on the agitator unit 164 having a spike (not shown) on its lower surface, that engages a correspondingly configured opening (not shown) on the nozzle 140, holding the nozzle 140 and agitator unit 164 together. This snap-together arrangement allows for different nozzles to be placed onto the apparatus 20. These different nozzles are designed for the specific type of particulate and surface that the apparatus 20 is to be operated on.

Figure 8:
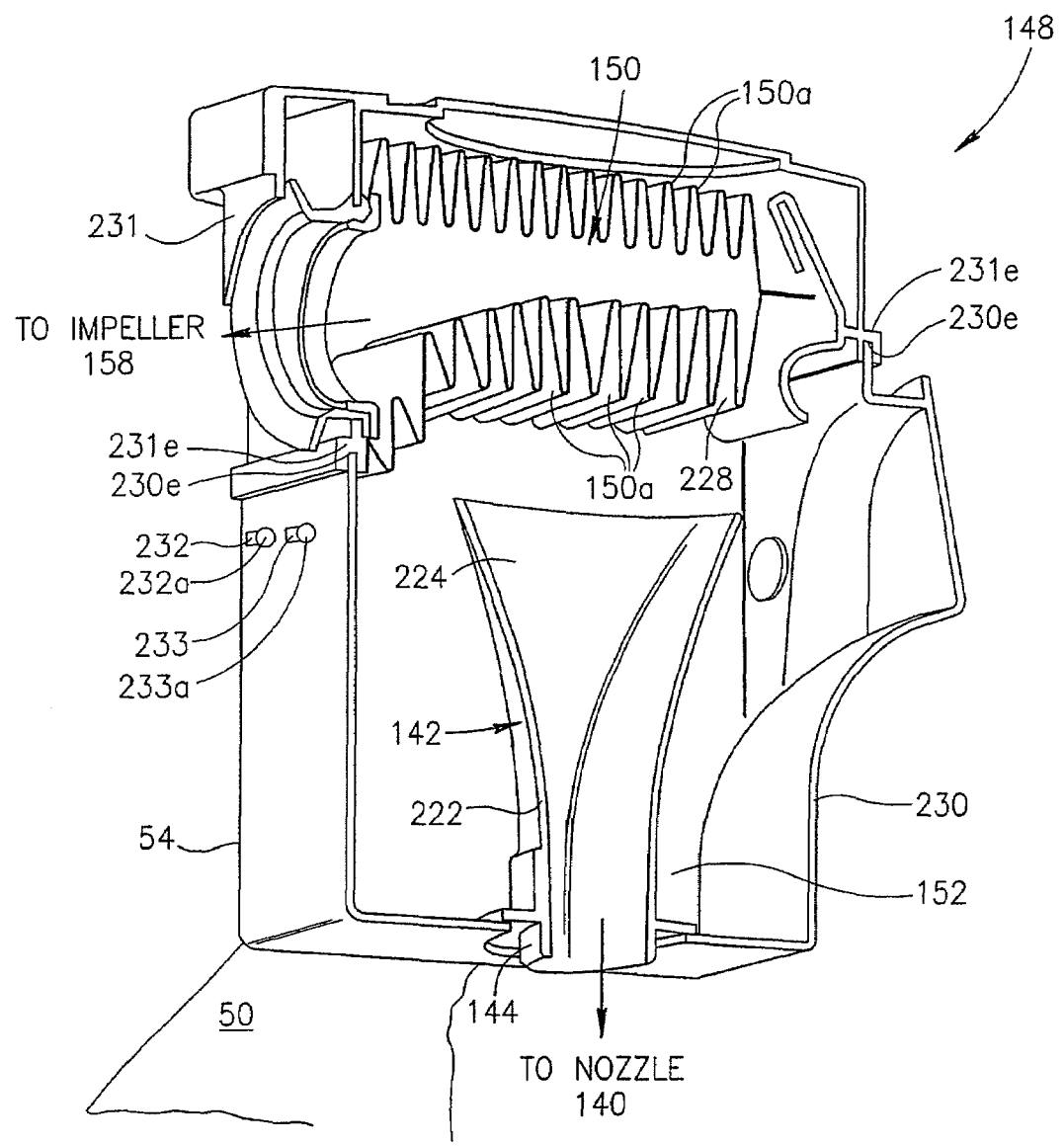
FIG. 8 is a cross sectional view of an embodiment of a filtration unit of the apparatus and a portion of the apparatus.
Figure 9A:
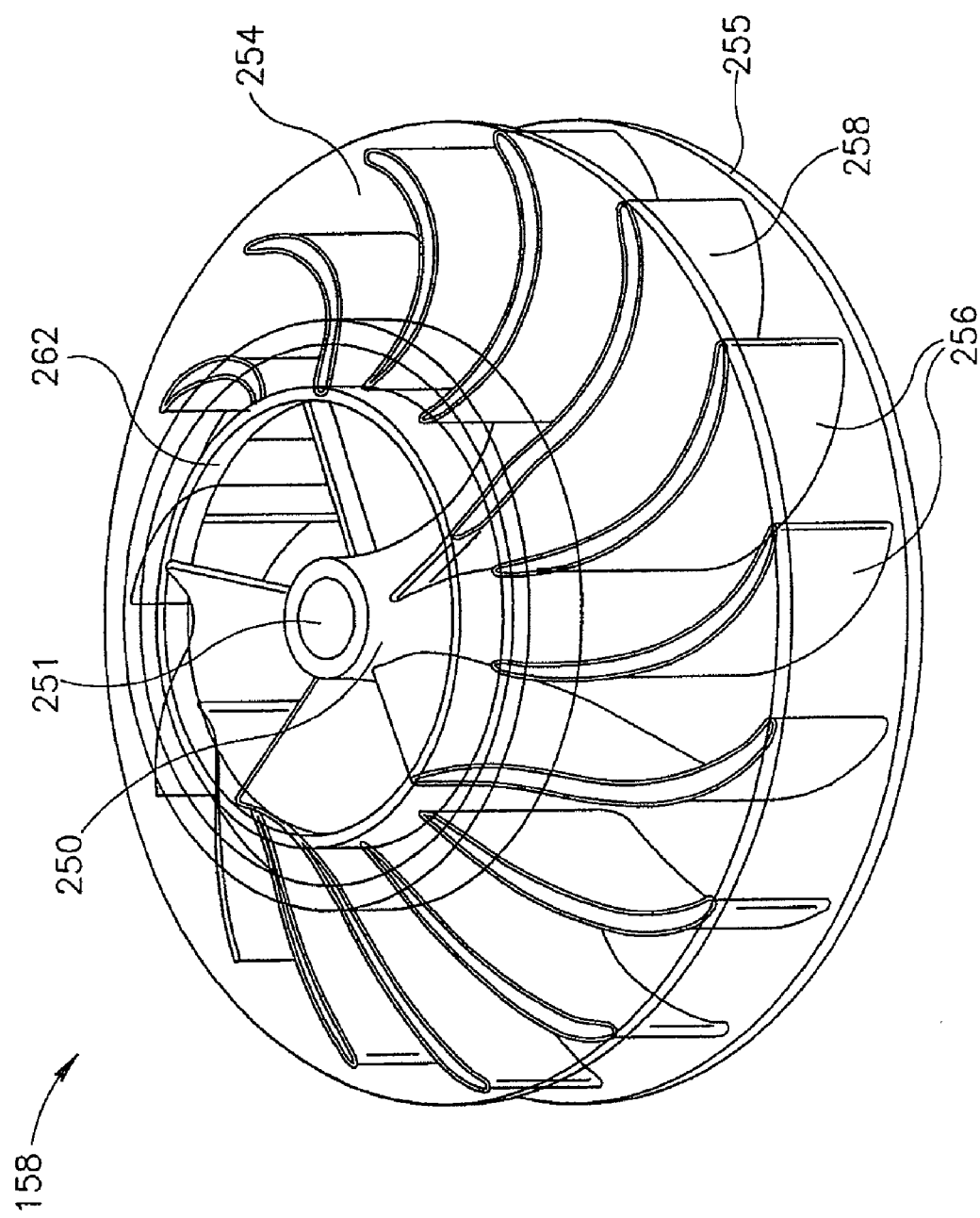
FIG. 9A is a perspective view of an embodiment of an impeller of the apparatus.
Figure 9B:
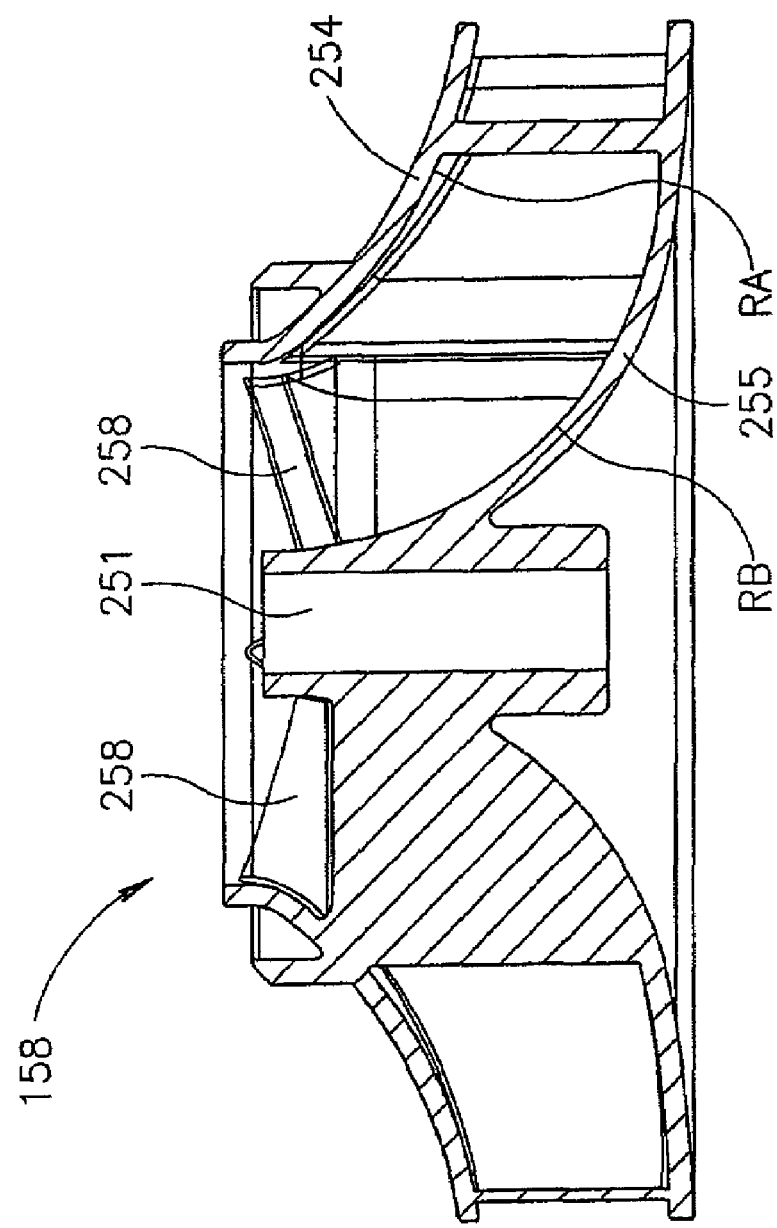
FIG. 9B is a cross sectional view of the impeller of FIG. 9A.
Figure 9C:
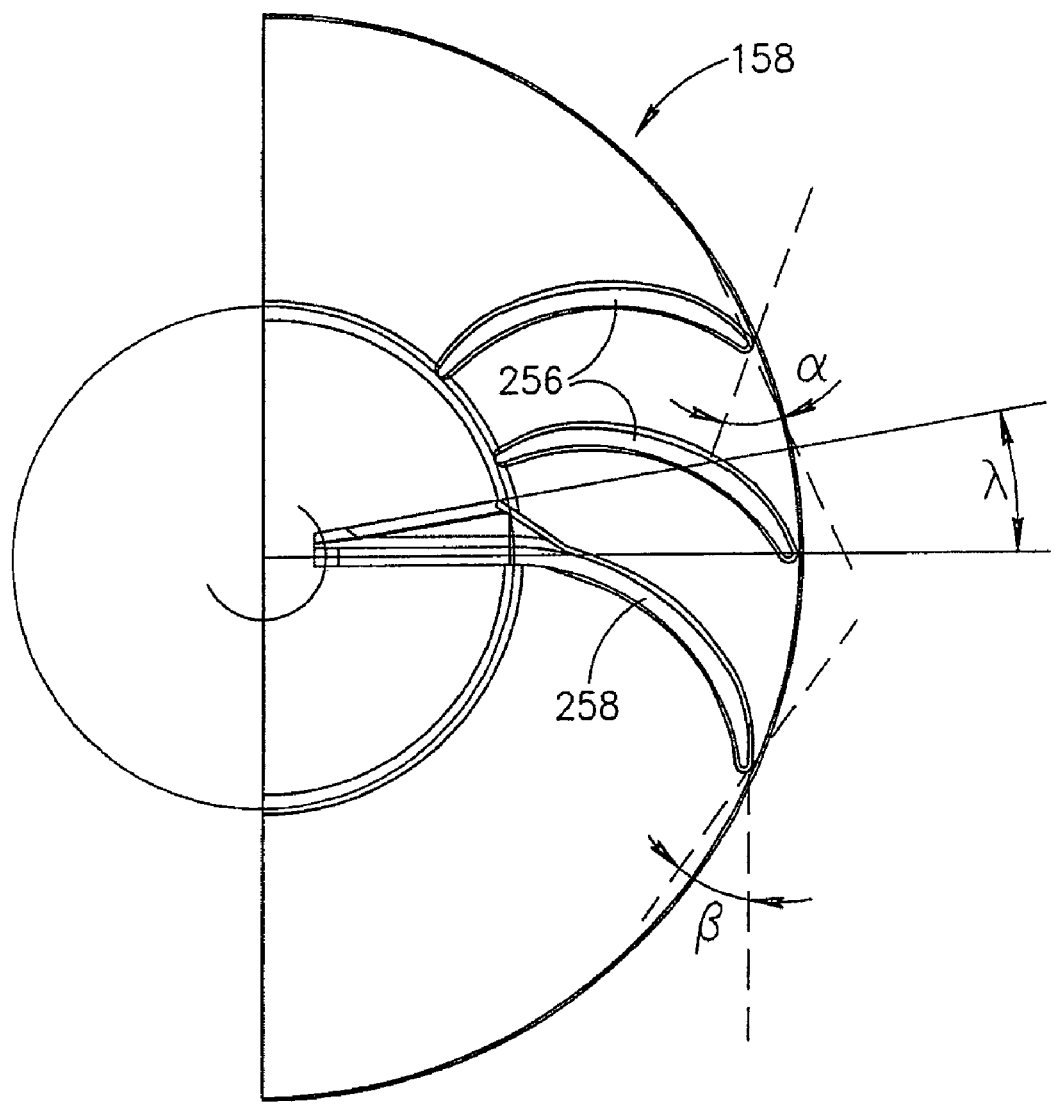
FIGS. 9C and 9D are sectional views of the impeller of FIG. 9A.
Figure 9D:
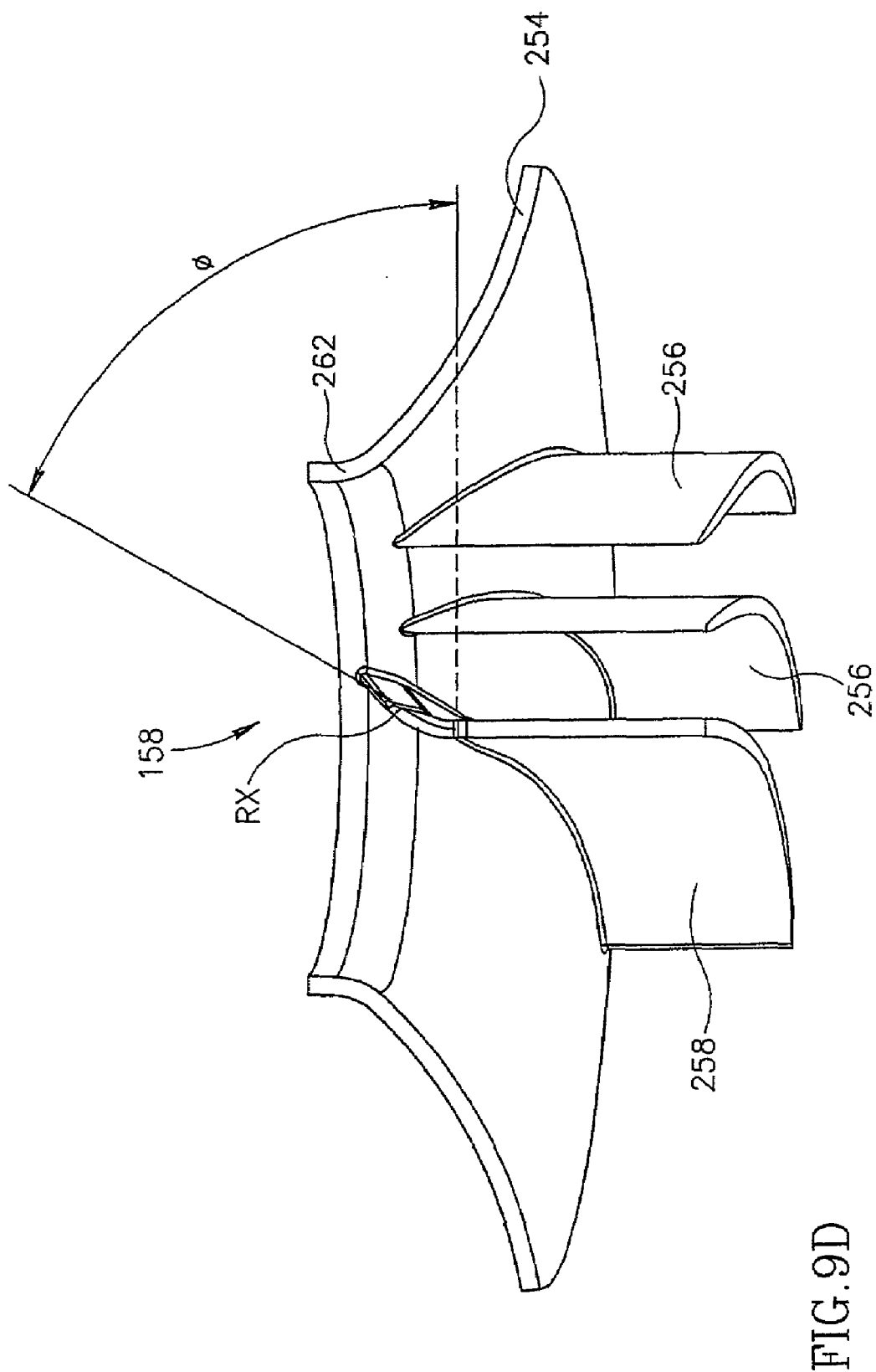

Turning also to FIG. 8, the tube 142 is formed of a neck 222 and an outwardly tapered head portion 224. The head portion 224 is typically of a diameter larger than the neck 222, and is of a configuration to push particles around the filter element 150 (having pleats 150a), that is open on its lateral sides and above it. This results in air circulation along the pleats 150a, that causes a self-cleaning effect, resulting in longer life for the filter element 150. Pressure loss is minimized due to reduced blockage of the material forming the filter element 150.

This filtration unit 148 is a box-like article of a transparent material, such as plastic or the like, to allow for full bin sensing (detailed below) and inspection by viewing. It can be easily removed, by lifting, from the apparatus 20, when the handle section 106 is lifted (as shown in FIG. 4). It typically separates into two pieces 230, 231 (allowing for emptying of dirt held therein), that when placed together along edges 230e, 231e, lock in a frictional engagement. A fist piece 230 forms the bottom of the unit 148, with its inner side serving as the particle collection area 152 or dirt cup.

The preferred material for the filter 150 is a material having a permeability of approximately 100 CFM per square foot.

Proximate the filtration unit 148 and within the apparatus 20 is a light transmitter 232 and a light receiver 233, that coupled with the requisite electronics, form a full bin sensing system 1020 (FIG. 23). The transmitter 232 and receiver 233 communicate with the filtration unit 148 through openings 232a, 233a in the extending portion 54 of the chassis 50 that borders the filtration unit 148. The light transmitter 232 and light receiver 233, with associated electronics, couple to the control system 1000. A "full bin" is sensed when dirt has accumulated in the filtration unit 148 to a point where light transmitted from the transmitter 232 can not be detected by the receiver 233. A signal is then sent from the control system 1000, for example, to an indicator light 26b indicating a full bin. (The filtration unit 148 can be removed and emptied as detailed above).

FIGS. 9A-9D show the impeller 158 in detail. The impeller 158 is constructed to pull particulates downstream upon rotation by the motor 160. The impeller 158 includes a central member 250, typically conical in shape, with a bore 251 therein for accommodating a motor shaft 270 or the like and plates 254, 255, with two types of blades 256, 258 therebetween. The upper plate 254 for example, has a radius of curvature RA of approximately 53 mm, while the conical portion 250 defining the lower plate 255 has a radius of curvature RB, for example, of approximately 39 mm.

These blades 256, 258 include short blades 256, that typically extend from at least proximate the ends of the plates 254, 255 to a point before the conical contour of the central member 250, and longer twisted blades 258, that extend from at least proximate the ends of the plates 254, 255 to the conical contour of the central member 250. The upper plate 254 includes an opening 262 to receive portions of the twisted blades 258.

Blades 256, 258 are typically arranged in threes, with typically two arced (or short) blades 256 between each twisted blade 258. There are typically five series of these three blade arrangements (two short blades and one twisted blade). Arced blades 256 are typically curved, so as to have exit angles a, typically 30±5 degrees, while twisted blades 258 typically are curved such that exit angles β beta are typically 30±5 degrees. These twisted blades include an upper blade twist angle λ along the conical portion 250 of for example, approximately 10 degrees, and an input angle Φ of approximately 60 degrees, and a radius of curvature RX of for example, approximately 9 mm.

The blades 256, 258 are typically arced in the same direction, between the plates 254, 255. This configuration of blades 256, 258 provides for high impeller efficiency of approximately 60%. (This efficiency is defined by the output airflow divided by the motor input power). The impeller 158 is typically an integral, one piece structure, made of hard plastic, such as HDPE, PVC, Nylon. It is typically made by techniques such as injection molding or the like.

The motor 160 is typically an 80 watt standard motor, or other similar motor. It includes, a shaft 270 extending therefrom, to which the impeller 158 attaches. This motor 160 is electrically connected to the power system 1070, and can operate at relatively low RPMs, for example here, the motor 160 may operate at approximately 7500 RPM. By operating at low RPMs, the motor operates at a low noise level and is energy efficient. The motor 160 is held on a motor support 272 (FIG. 5A), that may be incorporated into the support member 162.

Turning to FIGS. 6A and 10A-10C, the agitator unit 164 includes rotating members 166a, 166b, typically brushes. These rotating members 166a, 166b are joined together by a pulley 300, attached thereto, that is received in a belt 302. The other end of the belt 302 is received by a shaft 306 of a motor (agitator motor) 308, that rotates the shaft 306, the motor 308 operated by the control system 1000.

Speed of the rotating members 166a, 166b (i.e., brushes) can be changed according to surface type, detected by the method detailed below and signaled to the control system 1000 that signals the motor 308, or manually entered into the control system 1000 by the user (typically via the remote controller 46 or through the user interface 25). For example, the rotating members 166a, 166b or brush speed may be approximately 3000 RPM on carpet, and about 500 RPM on hard floors. The low RPM on hard floors is to eliminate particles from escaping under the nozzle 140 due to their high energy. This problem does not exist in carpets since there is not a gap between the nozzle 140 and the carpet.

One method for defining or detecting the surface type is by measuring the load on the motor 308 that drives the rotating members 166a, 166b (brushes). This is due to a difference in load on the motor 308 between hard floors and medium to deep (e.g. medium to deep pile) carpets. These loads are signaled to the control system 1000, that processes this information and signals the motor 308 to rotate the rotating members, at the above described speeds for hard floors and carpets, respectively.

When on deep carpets, the height of the rotating members 166a, 166b is relative to the position of the drive wheels 72, so that in deep carpets (e.g., deep pile carpets) a noticeable height can be measured as the drive wheels 72 sink in the carpet, while the rotating members 166a, 166b, float on the carpet. Accordingly, the control system 1000 can detect that deep carpet is the surface over which the apparatus 20 is traveling, as detailed below. Based on this height detection, the control system 1000 can signal the motor 308 to the aforementioned speeds. For example, greater heights with respect to the surface 183 are indicative of carpets, and thus, the control system 1000 signals the motor 308 to rotate the rotating members 166a, 166b at the high speed, of approximately 3000 RPM. Alternately, lower heights with respect to the surface 183 are indicative of hard floors, and thus, the control system 1000 signals the motor 308 to rotate the rotating members 166a, 166b at the low speed, of approximately 500 RPM.

These two surface detection mechanisms typically operate dynamically and "on the fly". They are typically sufficient in detecting most surfaces. However, the aforementioned surface detection mechanisms may be of lesser accuracy with respect to low or low pile carpets.

Accordingly, the motor 308 and rotating members 166a, 166b, as coupled with the control system 1000, can also serve as a third surface detection mechanism. This system is particularly effective in detecting these low or low pile carpets. This is done in the microprocessor 1004, that will analyze the load on the motor 308 for the rotating members 166a, 166b as a function of resistance provided by the surface being traversed. This detection mechanism involves a short shut down of the motor 308, for example, approximately 0.5 seconds. Accordingly, rotation of the rotating members 166a, 166b ceases. If the surface or ground provides resistance to the rotating members 166a, 166b, this resistance and resulting movement (rotation) of the rotating members 166a, 166b, will result in a back electromotive/electromagnetic force (EMF) on the motor 308, that is measured as a voltage. These measurements are sent to the control system 1000, that signals the motor 308.

For example, where back EMF is low to negligible, the surface being traversed is most likely a hard floor, whereby the control system 1000 will signal the motor 308 to rotate the rotating members 166a, 166b, at a slow speed, typically approximately 500 RPM for hard floors, as detailed above. Alternately, where back EMF is large, the surface being traversed is most likely a carpet, such as the low or low pile carpet, whereby the control system 1000 will signal the motor 308 to rotate the rotating members 166a, 166b, at a high speed, typically approximately 3000 RPM for carpets, as detailed above.

Figure 10A:
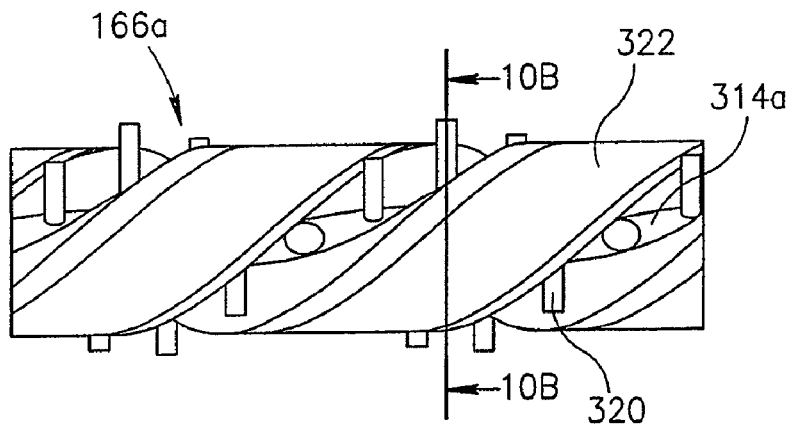
FIG. 10A is a sectional view of a rotating member of the apparatus.
Figure 10B:
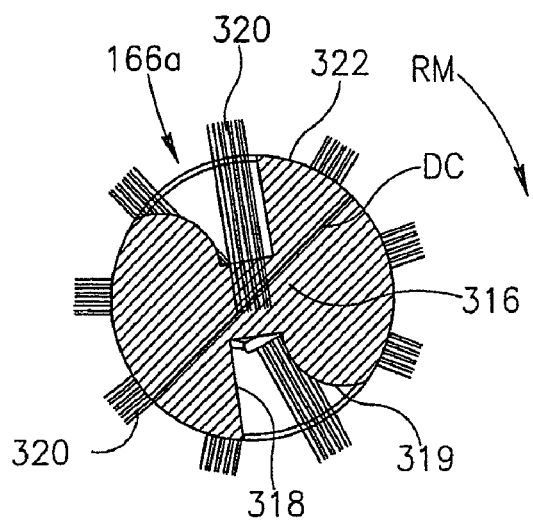
FIG. 10B is a cross-sectional view of the rotating member of FIG. 10A, taken along line 10B-10B.
Figure 10C:
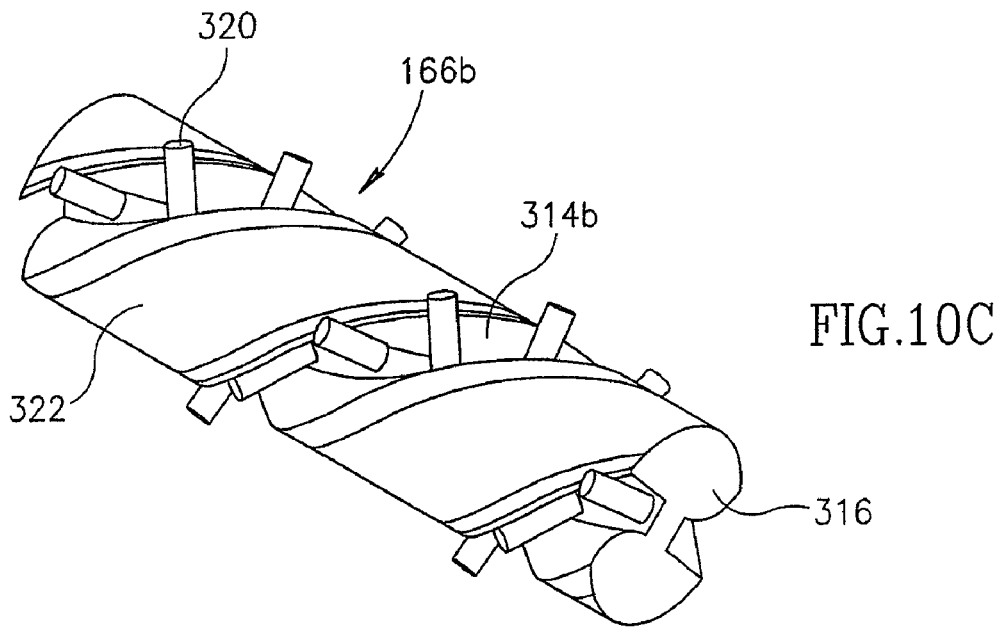
FIG. 10C is a sectional view of a rotating member of the apparatus.

Turning to FIGS. 10A-10C, the rotating members 166a, 166b will be described with respect to a single rotating member 166a, that is exemplary of both rotating members 166a, 166b. Accordingly, all components of both rotating members 166a, 166b are the same and are numbered as such, except for grooves 314a, 314b, that are the same in construction, but are numbered differently to illustrate operational principles, as detailed below. The rotating members 166a, 166b both include a core 316 of diameter DC and a helical groove 314a, 314b, respectively, that extends into the core 316. Diameter DC is typically large, for example, approximately 30 mm, resulting in a typically large perimeter of approximately 10 cm, so as not to allow fringes or other carpet or rug fragments to wrap around the core 316. The groves 314a, 314b include a leading edge 318, that is preferably straight and at least substantially parallel with respect to the vertical, and a trailing edge 319 that is preferably rounded. (The leading edge 318 and trailing edge 319 of the grooves 314a, 314b are referred to as such, in accordance with the preferred rotational direction of the rotating members 166a, 166b, indicated by arrow RM.)

Bristles 320, anchored into the core 316 of the rotating member 166a, 166b, by conventional fastening techniques, extend from the core 316, through the groove 314a, 314b to slightly beyond the outer surface 322 of the rotating member 166a, 166b. By resting in the grooves 314a, 314b and the grooves 314a, 314b dimensioned as detailed herein, the bristles 320 can bend, so as not to inhibit torque on the rotating members 166a, 166b. These bristles 320 are typically made of nylon or the like.

The rotating members 166a, 166b are connected to the pulley 300 at an orientation where the respective grooves 314a, 314b form a "V", such that these grooves 314a, 314b spiral outward from the center of the apparatus 20. This orientation of the grooves 314a, 314b, coupled with their construction, the diameter of the core 316, bristle 320 arrangement in the grooves 314a, 314b and length, moves dirt toward the center or inward into the nozzle 140. These rotating members 166a, 166b are also detachable, and can be replaced with other suitable brushes or the like.

Figure 11:
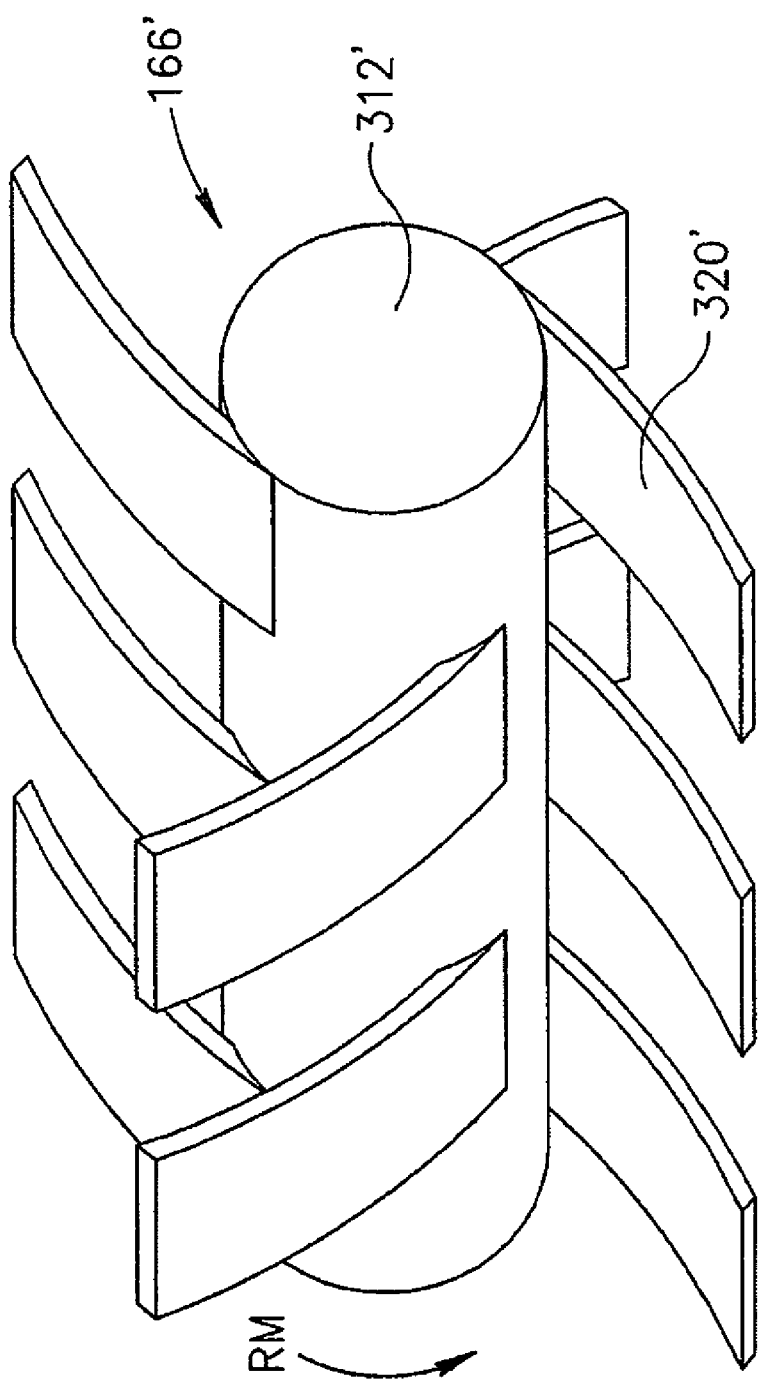
FIG. 11 is a perspective view of an alternate embodiment of a rotating member, typically a brush, for the agitator unit of the present invention.

Alternately, as shown in FIG. 11, there is an alternate rotating member 166', typically a brush with a core 312', that is attached to the agitator unit 164 as detailed above. The rotating member 166' is similar in all aspects to the rotating members 166a, 166b, except where indicated. The rotating member 166' is formed of resilient members 320', for example, of hard plastic, rubber or the like, embedded therein or attached thereto. Upon rotation of the brush, the rotating members 320' strike the surface with a force sufficient to agitate or bring up particulates. These members 320' can also bend, so as to keep torque on the rotating member 166' at suitable levels for proper operation.

Figure 12A:
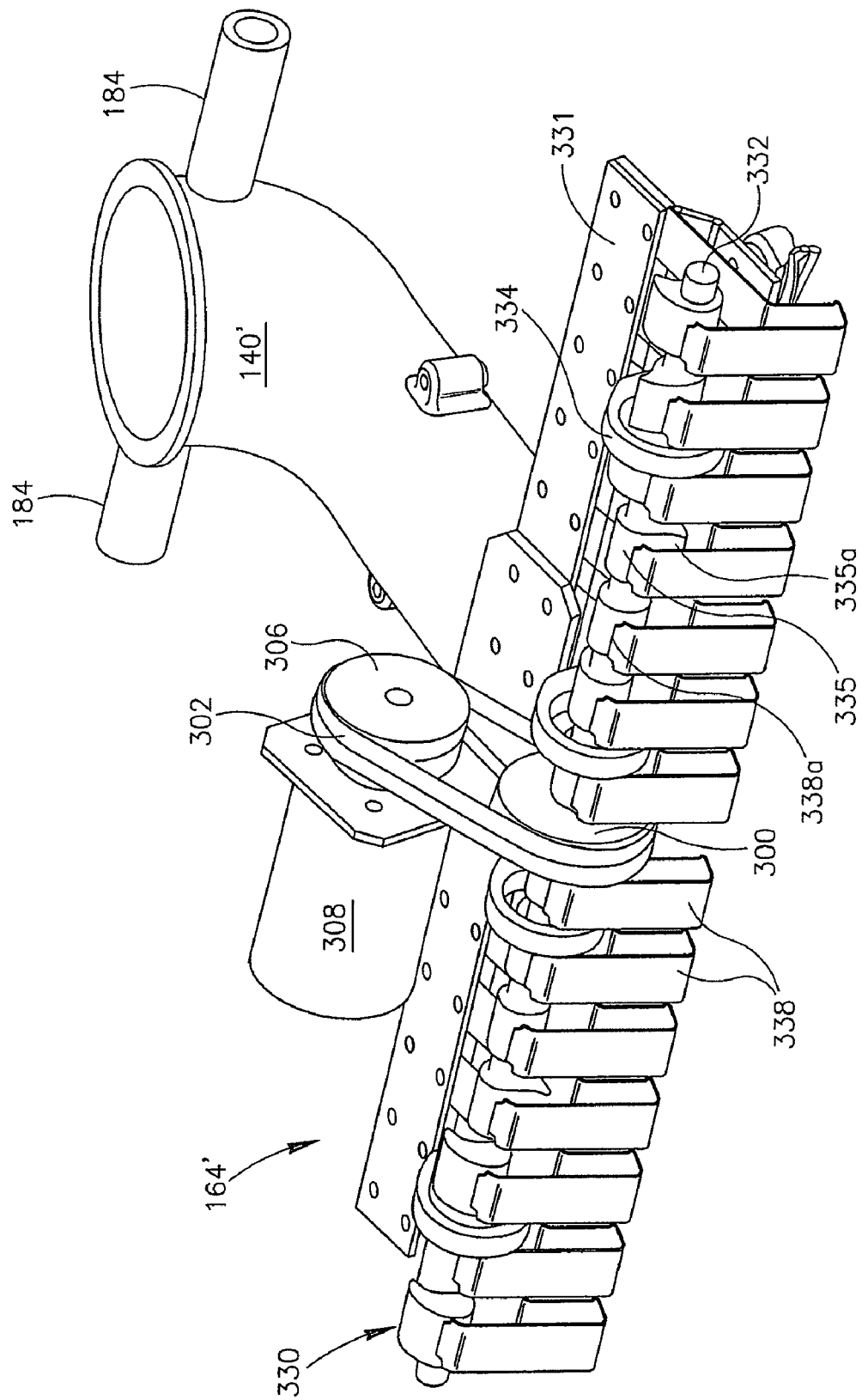
FIGS. 12A and 12B are top and bottom views of an alternate nozzle and agitator unit for the present invention.
Figure 12B:
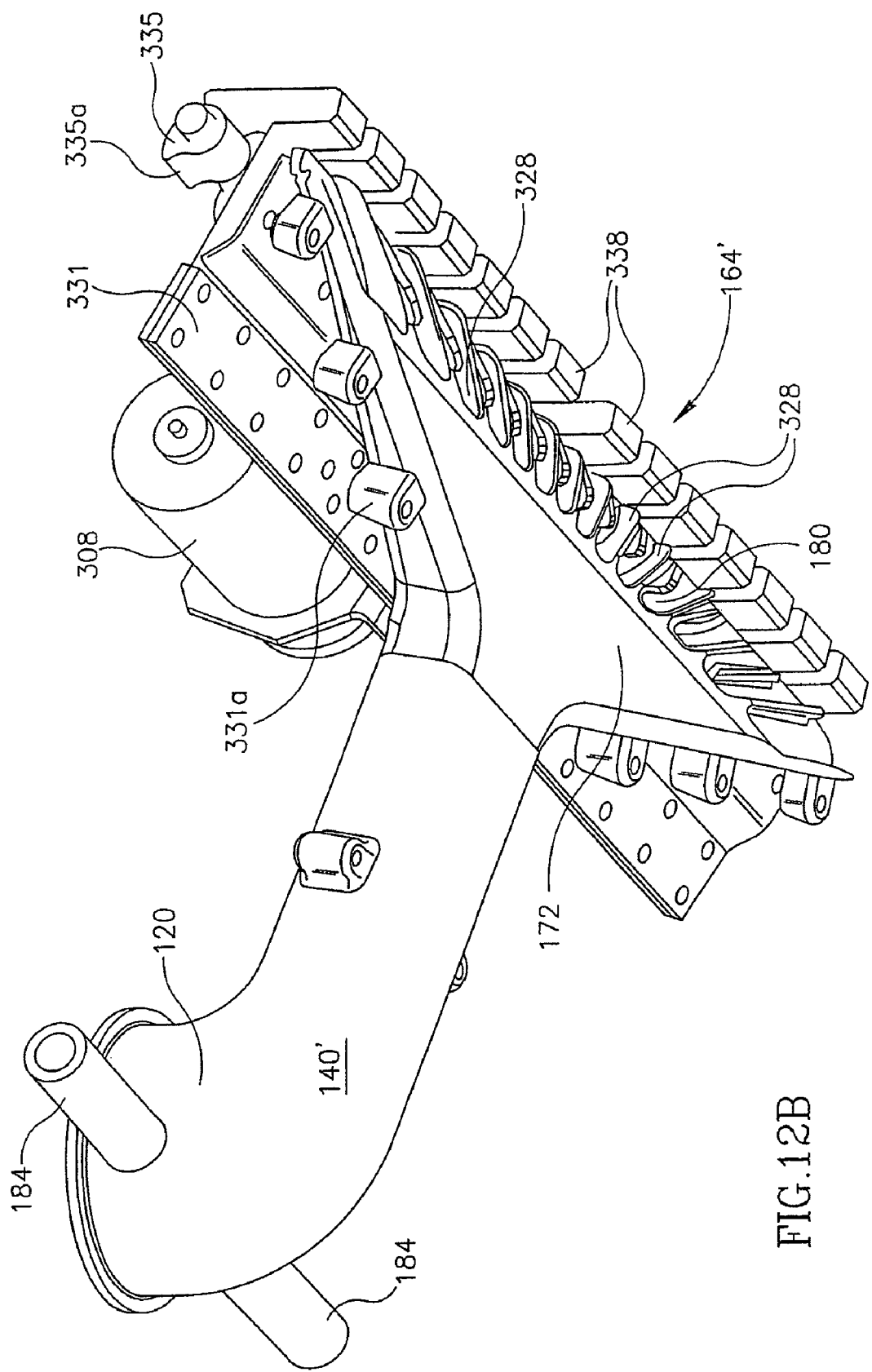

FIGS. 12A and 12B detail alternate embodiments of the nozzle 140' and for the agitator unit 164'. All components are the same as those in the nozzle 140 and agitator unit 164 detailed above, except where indicated. In the nozzle 140', there are protrusions 328 at the nozzle opening 180, to make airflow uniform at the nozzle opening 180. In the agitator unit 164', the rotating members have been replaced by a clapping unit 330. The clapping unit 330 attaches to the nozzle 140 by a plate 331, via screw mechanisms 331a or the like. This clapping unit 330 includes the pulley 300 attached to a rod 332, on which are connected wheels 334 and cams 335 with lips 335a, that upon rotation of the rod, move clips 338, by lifting their flanges 338a, up and down, typically at different times (although all at the same time is also suitable), to create agitation of particulates for suction.

Figure 12C:
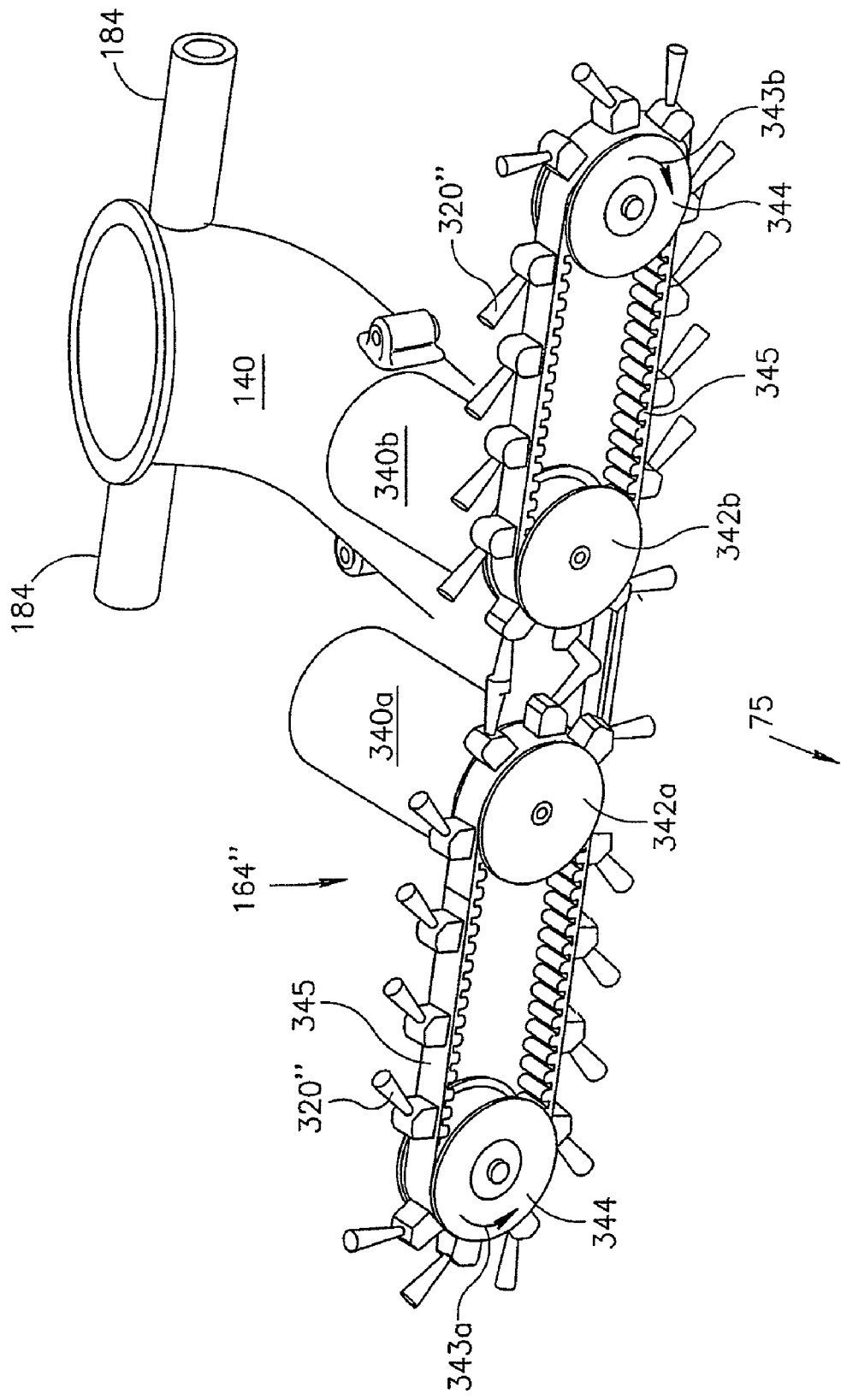
FIG. 12C is a perspective view of an alternate agitator unit of the present invention.

FIG. 12C details another alternate embodiment agitator unit 164". Here, there are two motors 340a, 340b, that typically rotate cams 342a, 342b in opposite directions, as indicated by the arrows 343a, 343b. However, the same direction for rotation is also permissible. Non-motorized cams 344, mounted to the apparatus 20 support belts 345 that include bristles 320". The belts 345 and bristles 320" travel in a direction substantially perpendicular to the direction of travel of the apparatus 20 (indicated by arrow 75). This substantially perpendicular direction of travel is sufficient to create the requisite agitation of particulates for suction as detailed above.

FIGS. 13 and 14 (in FIG. 14, the support member 162 is partially cut away) detail the shock detection system 1082 (FIG. 23) for the apparatus 20. This system includes bumper member 360, having rods 362 received in oppositely disposed lateral supports 364, that abut lateral segments 162a, typically having an inverted "L" shaped contour, on the support member 162. The rods 362 are hooked to springs 366, that in turn are hooked to the vent bars 163a of the support member 162. The springs 366 pull the rods 362 upward, such that the lateral supports 364 engage the lateral segments 162a. This attachment provides the ends of the lateral supports 364 with pivotal movement at pivot points 365a, 365b, from the lateral segments 162a. This pivotal movement may occur upon frontal or top impacts to the apparatus 20. The lateral supports 364 include oppositely disposed protrusions 370 that are received in correspondingly configured tracks 372 on the inner wall 110 of the bumper section 104 (only one shown). The positioning of the bumper member 360 in the apparatus 20 is such that shock detection is provided along an arc of approximately 200 degrees.

The bumper section 104 is supported at its center of gravity, inhibiting tilting torque from developing during acceleration and deceleration of the apparatus 20. The linear force on the center of gravity during acceleration, is balanced by the spring 366 force, where the front mounting eliminates any movement during deceleration. Additionally, the bumper section 104 and bumper member 360 are connected such that a static force of approximately 0.26 kilograms (Kg) on the upper and lower ends of the bumper section 104 and increasing to a static force of 1.2 Kg at the center will activate a signal to the control system 1000 that the bumper section 104 has contacted an obstacle and for example, the drive system 1040 must be signaled to cease motion, by the control system 1000. Typically, the drive system 1040 will stop motion, such that the apparatus 20 has traveled not more than approximately 15 cm from the time of impact with the obstacle.

The rods 362 are connected by a central member 374, that rests between arms 376 from a spring 378. These arms 376, each rest in grooves 380, within a guide 382, and while movable, provide a resistive force against lateral movement of the central member 374, in the case of side impacts on the apparatus 20.

Metal clips or plates (not shown) extend along the inner sides of the lateral supports 364, and contact metal members (not shown) at the pivot points 365a, 365b on the lateral segments 162a, to form electrical contacts. Arms 376, also of a metallic material, contact a metal band 388 on a member 390 rearward of the guide 382. In the case of a front impact of sufficient force (overcoming that of the springs 366), the bumper member 360 will be moved pivotally. There are also electrical leads 392 throughout this member 360 to which wires or the like are connected for coupling with the electronics of the control system.

In operation, if at least one of the four electrical contacts at the pivot points 365a, 365b is broken, typically as a result of a front, side or top impact to the apparatus 20, a signal will then be sent to the control system 1000, that will then, for example, signal the drive system 1040 to cease motion immediately. In the case of a side impact, the bumper member 360 will move laterally, such that this movement causes at least one of the arms 376 to move out of contact with the band 388. This will also cause a signal to be sent to the control system 1000, that will then, for example, signal the drive system 1040 to cease motion. Specifically, these pivotal and lateral movements are caused by contact to the bumper section 104 at the front of the apparatus 20. The bumper member 360 is configured for example, such that movements of approximately 2 mm or greater to the bumper section 104 or forces as detailed above, will cause these pivotal or lateral movements, to occur, whereby at least one requisite electrical contact is made or broken. This change in electrical contact will result in a signal being sent to the control system 1000, that will signal the drive system 1040 to stop, ceasing motion of the apparatus 20 (as detailed above). Motion ceases within the depression limits of the bumper member 104, that is typically not more than 20 mm.

Figure 15:
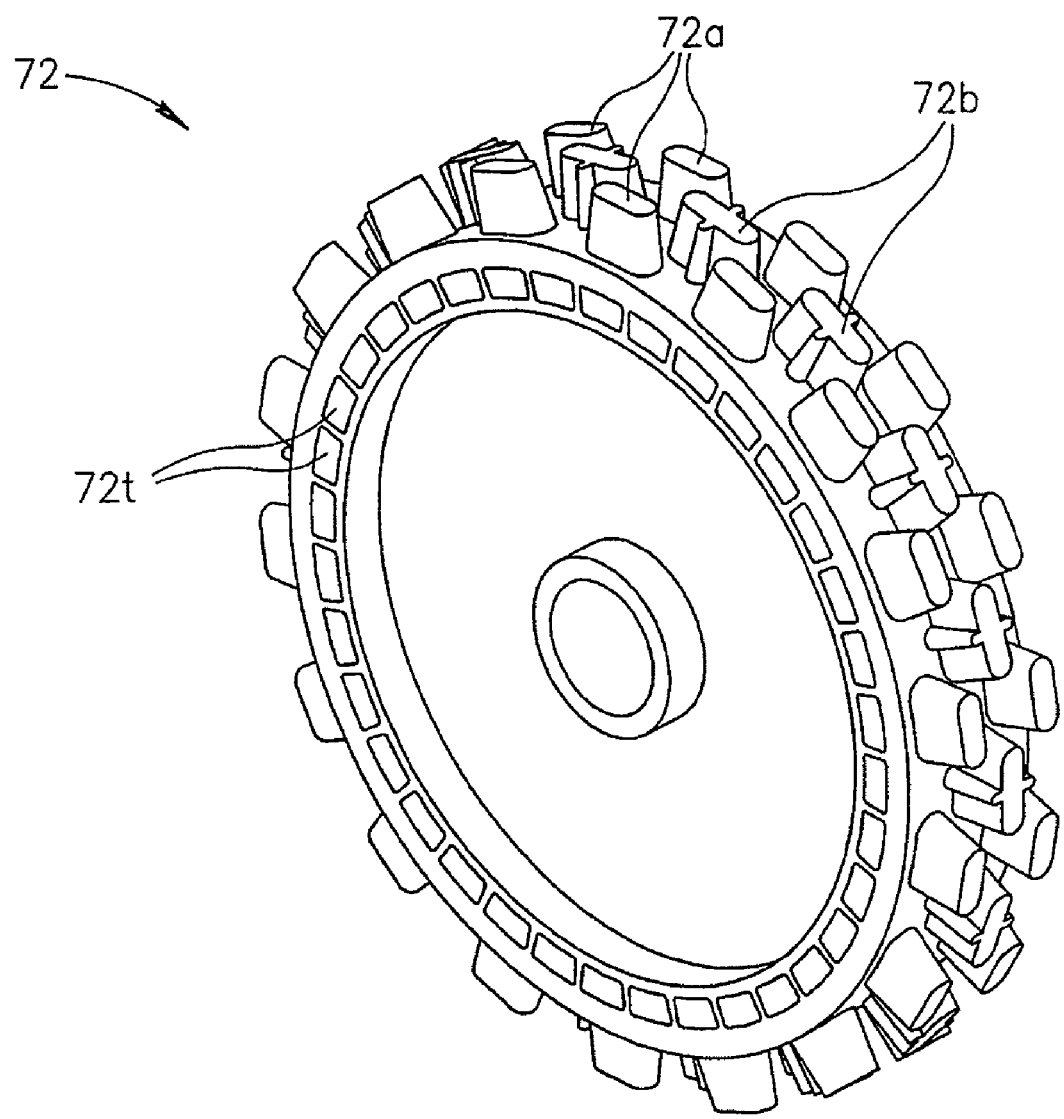
FIG. 15 is a perspective view of a drive wheel.

FIG. 15 shows a drive wheel 72 (representative of both drive wheels), that typically includes a tread portion 72t formed of lateral protrusions 72a, defining outer rows, with central "+" shaped protrusions 72b, defining an inner row. This provides the drive wheel 72 with increased traction, to minimize slippage along various surfaces, for example, hard floors and carpets. This allows for precise movement of the apparatus 20. The drive wheel 72 at this treaded portion is typically made of a soft rubber or the like.

The protrusions 72b of the inner row are "+" shaped so as to be reinforced laterally, to establish a central point for turning. The protrusions 72a of the outer rows are flexible laterally, to smooth the drive path and are flexible laterally allowing for turning with minimal movement of the turning center. The gaps between protrusions 72a of the outer rows, improve climbing on carpets, should the carpet be approached from an angle.

Figure 16:
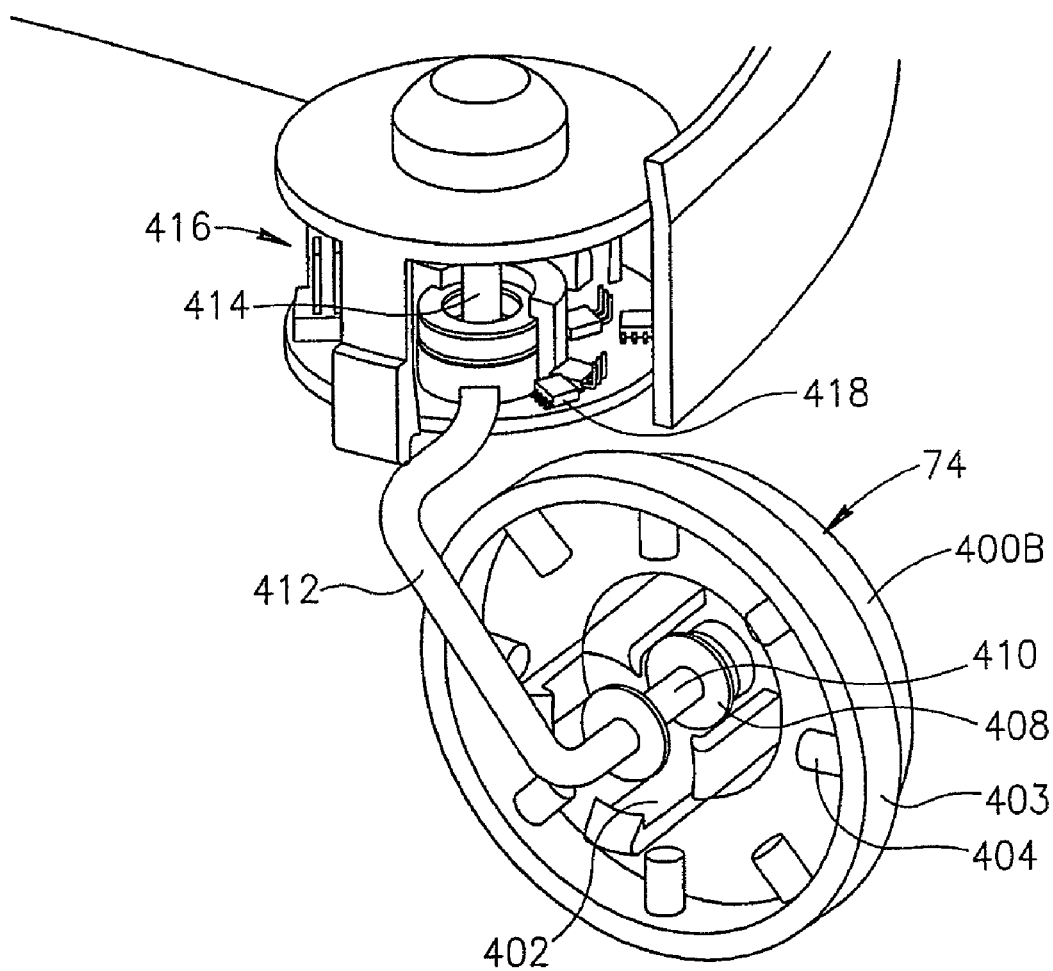
FIG. 16 is a sectional view of the support wheel assembly.

FIG. 16 shows the support wheel 74 in an assembly that with associated electronics forms a portion of the drive system 1040 (FIG. 23) that couples to the control system 1000. The support wheel 74 is, for example, a castor wheel, typically formed of two shells 400a, 400b (FIG. 2), so as to have a hollow inner chamber 402. For additional traction, there can be a band 403 (FIG. 2), made of rubber or the like, placed around the support wheel 74. Here, there are magnets 404, or other metal objects detectable by magnets or the like. The shells 400a, 400b also include aligned bores 408 for receiving the axial portion 410 of a movement arm 412 (the other portion of the movement arm 412 being the main portion 414). The support wheel 74 tracks odometry and angles of travel, to signal the control system 1000 for determining direction and orientation of the apparatus 20.

The movement arm 412, at its main portion 414 is rotatably mounted within a sensor unit 416. This sensor unit 416 includes several, typically three, magnetic field sensors 418, such as hall effect sensors, located over a circle around the arm 412. These sensors 418 send signals to the control system 1000.

The positions of the magnets 404 in the wheel inner chamber 402, based on the angle with respect to the horizontal, coupled with the rotations of these magnets 404, are utilized by the control system 1000, in an odometer function, to determine total displacement. By monitoring the signal obtained from the magnetic field sensors 418, both the travel distance and the orientation of the castor wheel 74 can be determined (the distance is obtained by counting the number of pulses induced by the traveling magnets 404 where the angle is calculated by comparing the strength of signal between the magnetic field sensors 418).

Based on these calculations of distance and displacement, the control system 1000 can adjust the steering 1030 and drive 1040 systems accordingly, to properly position the apparatus 20. The control system 1000 with this information can also control the navigation system accordingly.

Figure 17:
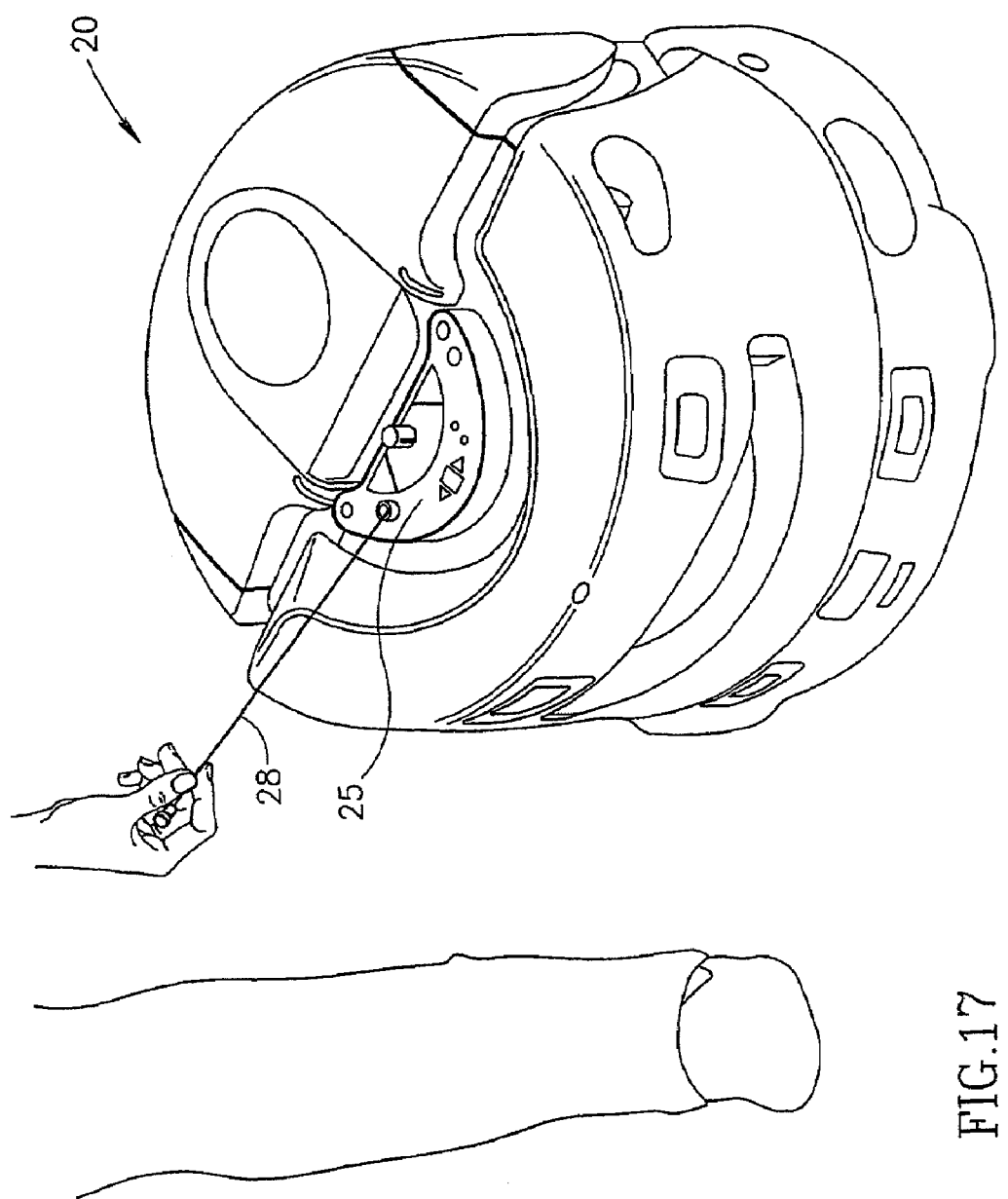
FIG. 17 is a perspective view of the apparatus in operation using the leash.
Figure 18:
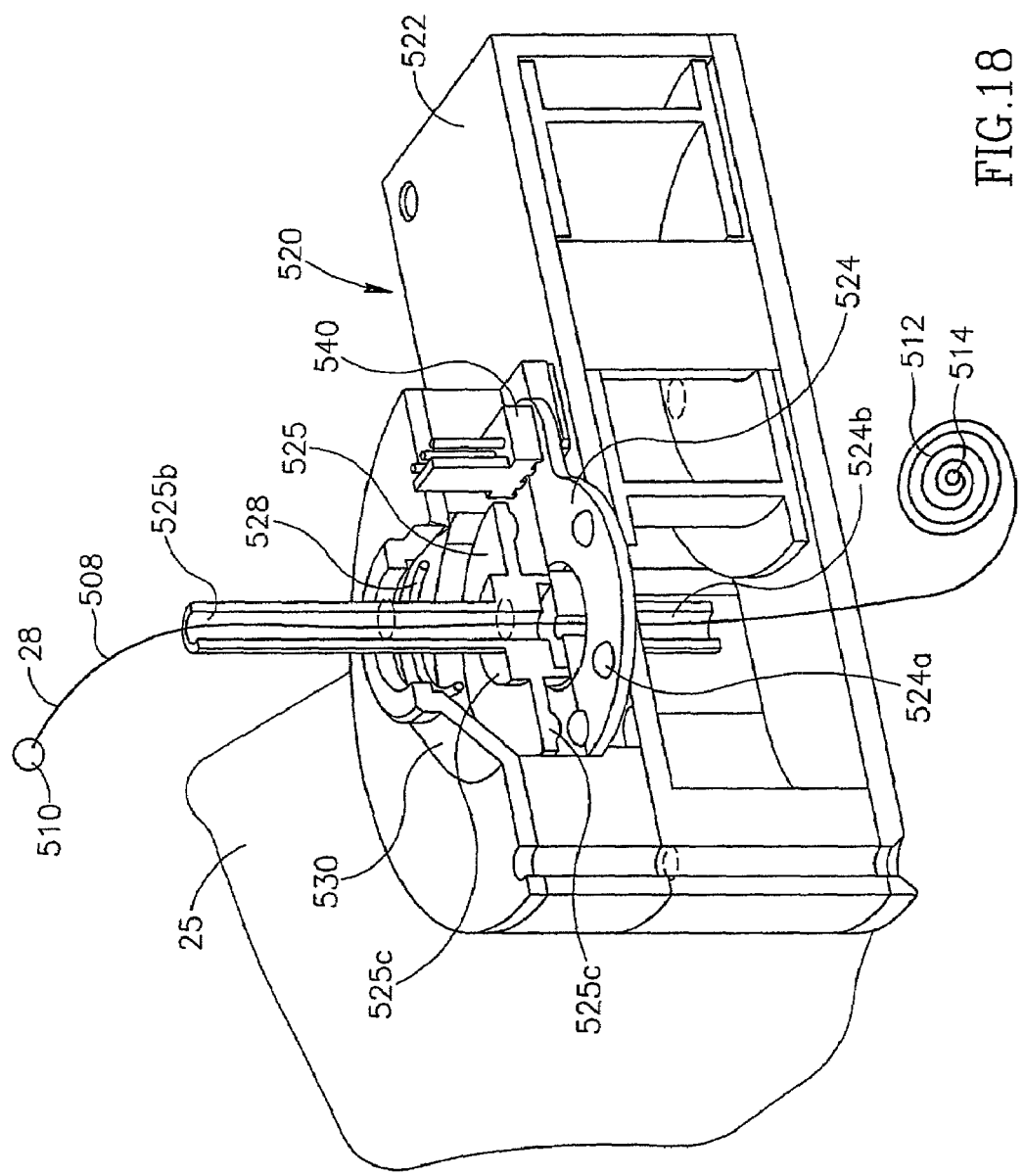
FIG. 18 is a cross sectional view of the leash assembly.

Turning to FIGS. 17 and 18, there is the leash 28 as detailed above. The leash 28 is a wire 508 or the like, and includes a balled end 510 and a coiled end 512, typically wrapped around a spring biased roller 514 in the body of the apparatus 20. The wire 508 extends through a mechanical member 520, intermediate its ends.

The mechanical member 520 includes a body 522, and oppositely disposed ring members 524, 525 with hemispherical protrusions 524a, 525a resting in each other in alignment. Ring members 524, 525 also include a tubular guide 524b, 525b. Upper ring member 525 is held in place by a spring 528, that is held in place by the body cover 530 and the neck 525c of the ring member 525. This spring 528 allows for movement of the upper ring member 525 when the leash 28 (wire 508) is pulled. A sensor(s) 540, coupled to the control system 1000, connects to the ring members 524, 525 and detects which protrusions 524a, 525a, were temporarily pulled out of alignment, and signals this back to the control system 1000. The control system 1000 recognizes this direction, and powers the drive wheels 72 accordingly, with the direction and orientation of the apparatus determined by the support wheel 74 and its sensors reporting to the control system 1000.

Turning now to FIGS. 3B and 19, there is a nozzle height adjusting system 560 (FIG. 23), coupled to the control system 1000, that raises and lowers the nozzle 140, in response to the surface, and in some cases, obstacles detected. The nozzle 140 includes a bracket 561 with an opening 562 therein. This opening 562 is engaged by a rod 564 attached to an adjustment mechanism 566, and with associated electronics, is coupled to the control system 1000. The nozzle 140 is spring mounted, and can be pushed upward, to contact a metal or magnetic portion 570 of a member 572 within a spring 573. The end of the metal member 572 is detected by a magnet (magnetic sensor) 580, for example, a hall effect sensor, that senses a position change for the member 572, and will indicate this change, via signals or the like to the control system 1000, that will signal the adjustment mechanism 566, typically including a motor 566a. This motor 566a will drive an eccentric member 566b, that translates rotation to vertical movement by moving the rod 564, and therefore the nozzle 140 up to the proper position. (The nozzle 140 will move down provided there is open space between the rotating members 166a, 166b, i.e., brushes, and the surface, as detailed below).

The nozzle height adjustment system 560, in particular the adjustment mechanism 566, typically functions to set only the minimum height for the nozzle 140 and rotating members 166a, 166b (i.e., brushes) (since the nozzle 140 is attached to the rotating members 166a, 166b, they are treated as a single unit-nozzle/rotating members, for purposes of this example description). Accordingly, it can adjust the nozzle 140/rotating members 166a, 166b, for higher surfaces automatically, since the nozzle 140/rotating members 166a, 166b can travel freely upward. The minimum height is required to keep the nozzle 140/rotating members 166a, 166b (i.e., brushes) at a desired height, and therefore reducing the load on the nozzle/rotating members, as induced by the carpet. On hard floors or other surfaces, the rollers 168 maintain the nozzle 140/brushes 166a, 166b at the correct height.

The measurement of height for the rotating members 166a, 166b (i.e., brushes) is also suitable for determining surface types, in particular, carpets versus hard floors or other surfaces. This can be achieved because the brushes 166a, 166b and nozzle 140 have a degree of freedom in the upward direction, and therefore, can follow the level or contour of the surface on which they are riding. For example, in carpets, the rollers 168 sink slightly, the brush height in relation to the rollers 168 will be different from this height on a hard floor, and thus the surface type can be determined.

The various sensors and systems formed by combinations thereof are further detailed below. All of these sensors are electrically coupled to the control system 1000, that in turn signals the drive system 1040 and drive wheels 72 to operate in various modes, depending upon the obstacle or opening detected.

Figure 20:
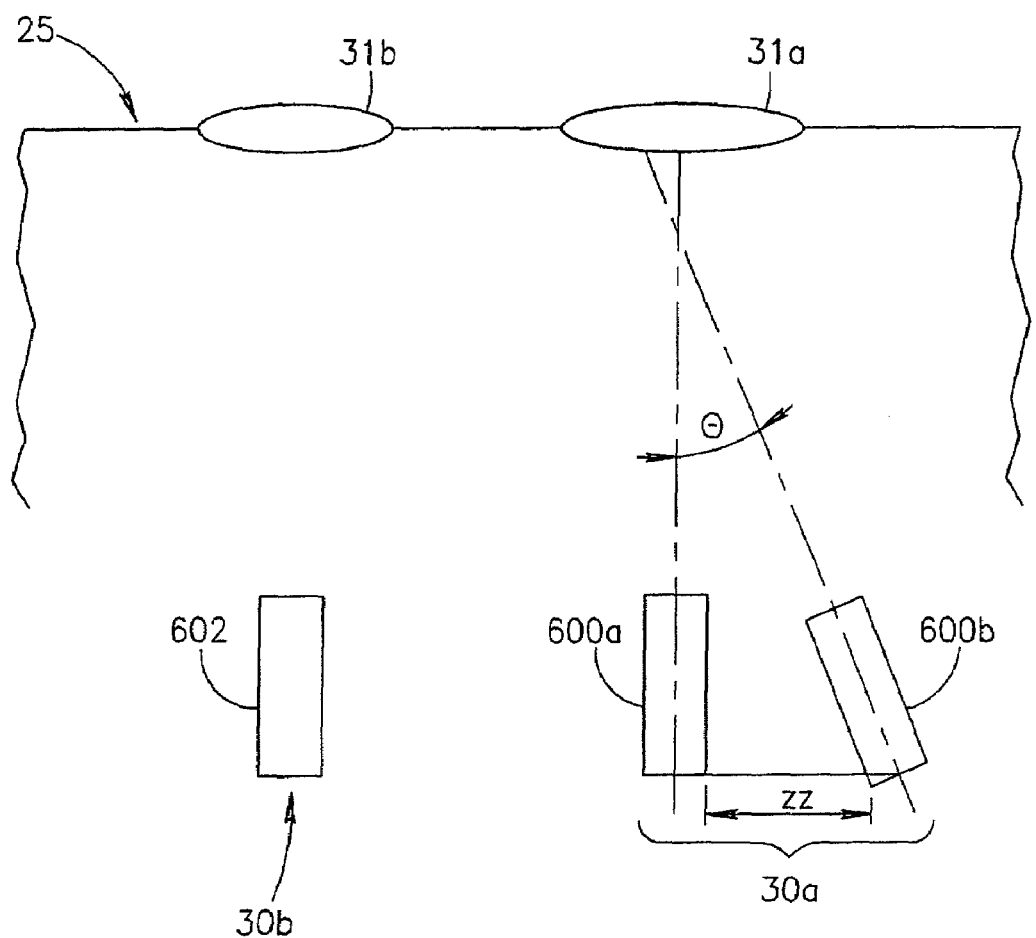
FIG. 20 is diagram of a door sensing system.
Figure 21A:
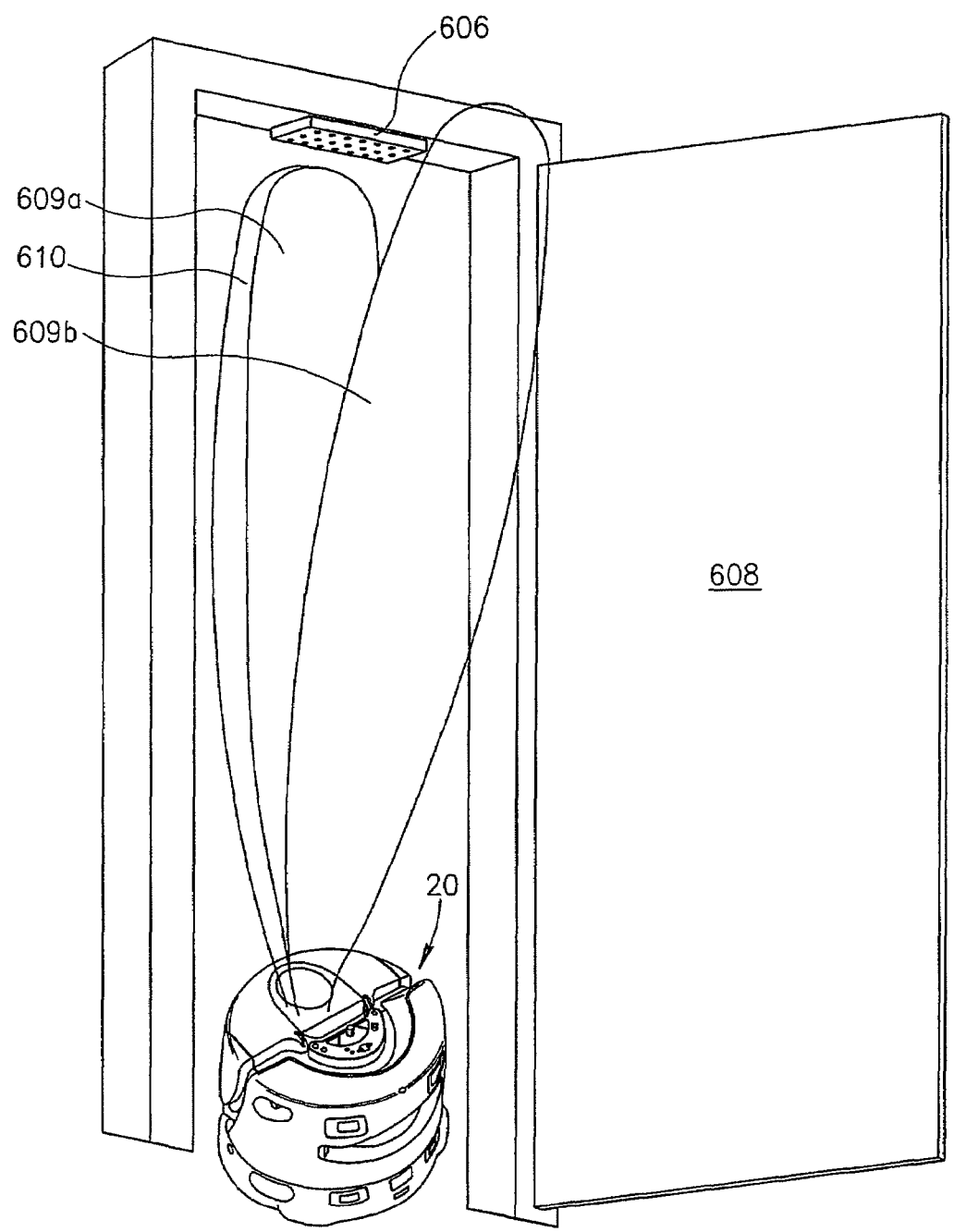
FIGS. 21A and 21B are diagrams of the door sensing system in operation with the apparatus of the invention.
Figure 21B:
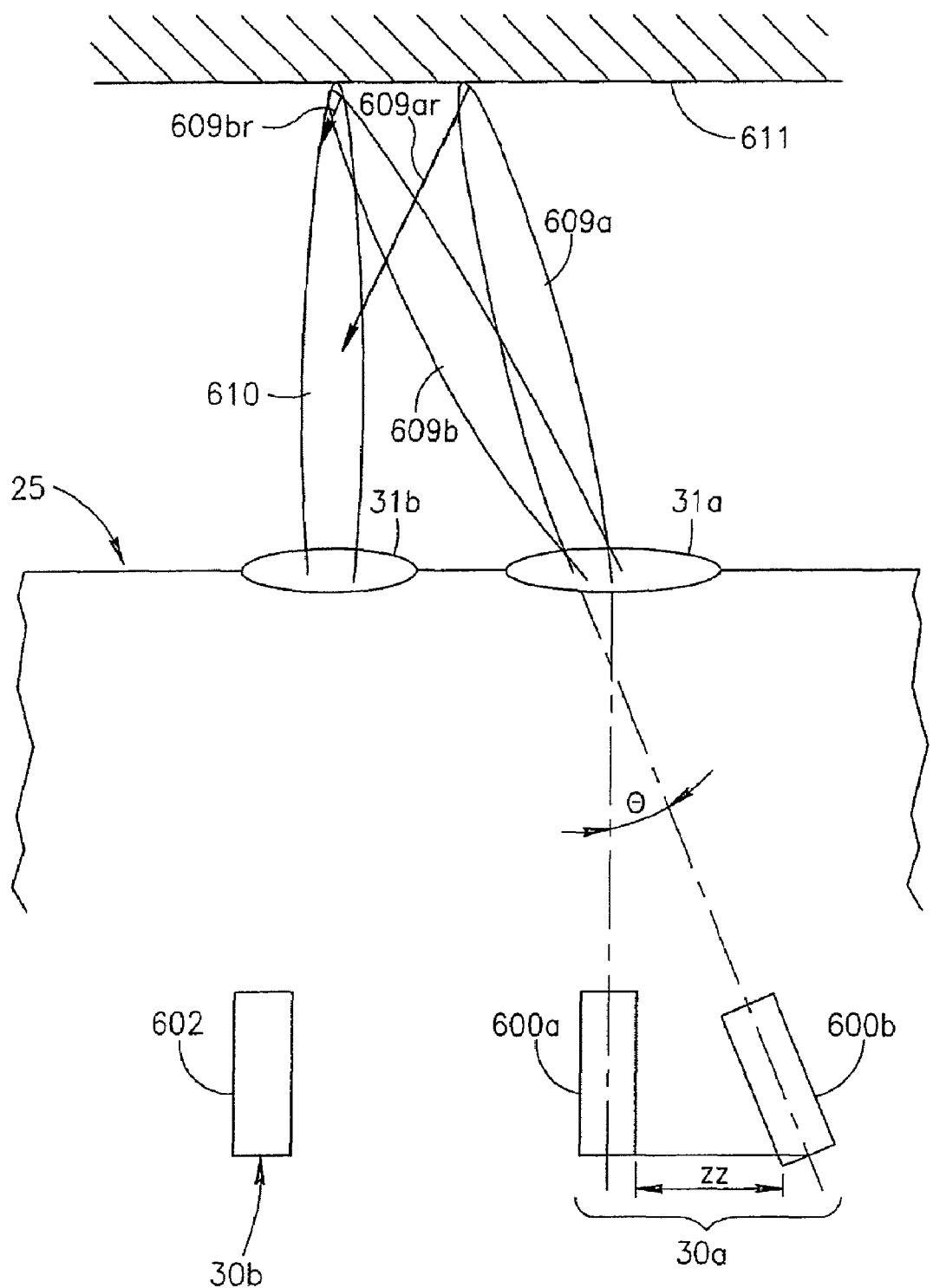

Turning also to FIGS. 20, 21A and 21B, door detection sensor 30a is typically formed of two infra-red (infrared or IR) transmitters 600a, 600b, while the other door detection sensor 30b is typically formed of an IR receiver(s) 602. The transmitters 600a, 600b are positioned at an angle $\theta$, with respect to each other, that is, for example, approximately 20-30 degrees, and at a distance zz from each other, for example, approximately 10 mm. One transmitter, here, transmitter 600a, and the receiver 602 are typically also tilted approximately 5 degrees (into the plane of the paper). This tilting limits potentially unwanted reflections from horizontal highly reflective surfaces such as metal door frames, mirrors, lights, reflectors, etc., since most of the light energy in these cases will be projected 10 degrees forward rather than returning to the receiver 602.

Door or boundary detectors include retro-reflectors 606 (reflectors that reflect light back at approximately the same angle received), typically sticker-like, of which one or more can be placed on the floor proximate the door 608 and/or within the doorjamb itself. Should a floor or wall boundary be desired, the retro-reflector 606 may be placed on the floor or wall, and similarly, the retro-reflector 606 may be placed on the ceiling to define the desired wall or floor boundary.

The transmitters 600a, 600b, by being arranged at this angle $\theta$, can detect the desired doors, and entryways for these doors, while distinguishing them from other locations, such as under tables, counters or the like. In operation, the transmitters 600a, 600b, emit light beams 609a, 609b (illustrated in FIGS. 21A and 21B for description purposes). The range for the receiver 602 is also represented by a beam 610 (also, only for description purposes).

In FIG. 21A, should a door be detected, the receiver 602, will detect a reflection of a beam from the corresponding transmitter 600a (illustrated by overlapping beams 609a, 610) off of the retro-reflector 606, while the receiver 602 will not detect a reflection from the second transmitter 600b.

In FIG. 21B, should an area of lower clearance than a ceiling or doorjamb be detected, such as a table 611 or the like, some portions of the light (beams) emitted from both transmitters 600a and 600b will be detected by the receiver 602, as illustrated by the arrows 609ar, 609br, being within the range of the receiver beam 610.

As these transmitters 600a, 600b and receiver 602 are in electronic communication with the control system 1000, the requisite signals, based on whether or not light, from zero, one or both sensors (transmitters) 600a, 600b was received (by the receiver 602), are sent to the control system 1000. This control system 1000, as detailed above, will signal the drive system 1040 (FIG. 23) ceasing motion of the apparatus 20 or changing direction of the apparatus 20 as per the determined travel (cleaning) pattern, as detailed below.

Similarly, the transmitters, receivers and reflector(s) can be replaced by any combination of transmitters, receivers and reflectors, provided they function as detailed above.

Contour sensors 34, 35, are typically mounted laterally, at the sides of the apparatus 20 at upper and lower positions. These sensors 34, 35 are used for detecting walls, furniture and other laterally positioned obstacles. These sensors 34, 35, are typically formed of an ultrasonic transmitter and an ultrasonic receiver. These contour sensors are in communication with the control system 1000, and should a wall, furniture or other lateral obstacle be detected, the control system 1000 will signal the drive system 1040 ceasing motion of the apparatus 20, as detailed above.

Obstacle sensors 36a, 36b, 37 for detecting obstacles, such as furniture, walls, or other obstacles, are typically arranged so as to cover the front of the apparatus 20. Here, front obstacle sensors 36a, 36b are disposed high and low on the apparatus 20 with respect to each other and in a substantially parallelogram-shaped pattern with respect to each other. The corner sensors 37, are in a relationship where their signals cross each other. For example, this crossing is typically at an approximately 90 degree orientation. These obstacle sensors 36a, 36b, 37 are typically ultrasonic transceivers, but other equivalent sensors are also permissible. These obstacle sensors 36a, 36b, 37 are in communication with the control system 1000, and should an obstacle be detected, will send a signal to the control system 1000 accordingly, that will typically cease motion of the drive system 1040, as detailed above.

For example, the obstacle sensors may be units, such as 40 Khz ultrasonic transducers, Part No. 400PT160, from Prowave. These ultrasonic sensors 34, 35, 36a, 36b, 37 define an array, and function as proximity sensors (of a proximity sensing system), that when coupled with the control system 1000, can provide a low resolution image of the obstacle path in front of the apparatus 20.

Another sensor of the obstacle sensors is a sensor 38, typically for horizontal object, for example, shelf detection. This sensor 38 typically includes a transmitter portion and a receiver portion, angularly upward (for example an angle of approximately 35 degrees with respect to the horizontal). This sensor 38 is typically a Position Sensing Diode (PSD), formed from infrared transmitting and receiving components, and, for example, may be a Sharp® infra-red sensor unit, Part No. GP 2D12 14 from Sharp Electronics, Japan.

As the aforementioned ultrasonic sensors may not detect all horizontal objects will vertical portions, this sensor 38 provides the requisite horizontal object detection. It also functions in combination with obstacle sensors 36a, 36b, 37 (and the control system 1000) to create a local map. Should a low obstacle be detected, a signal will be sent to the control system 1000 that will signal the drive system 1040, ceasing motion of the apparatus 20, as detailed above.

Figure 22A:
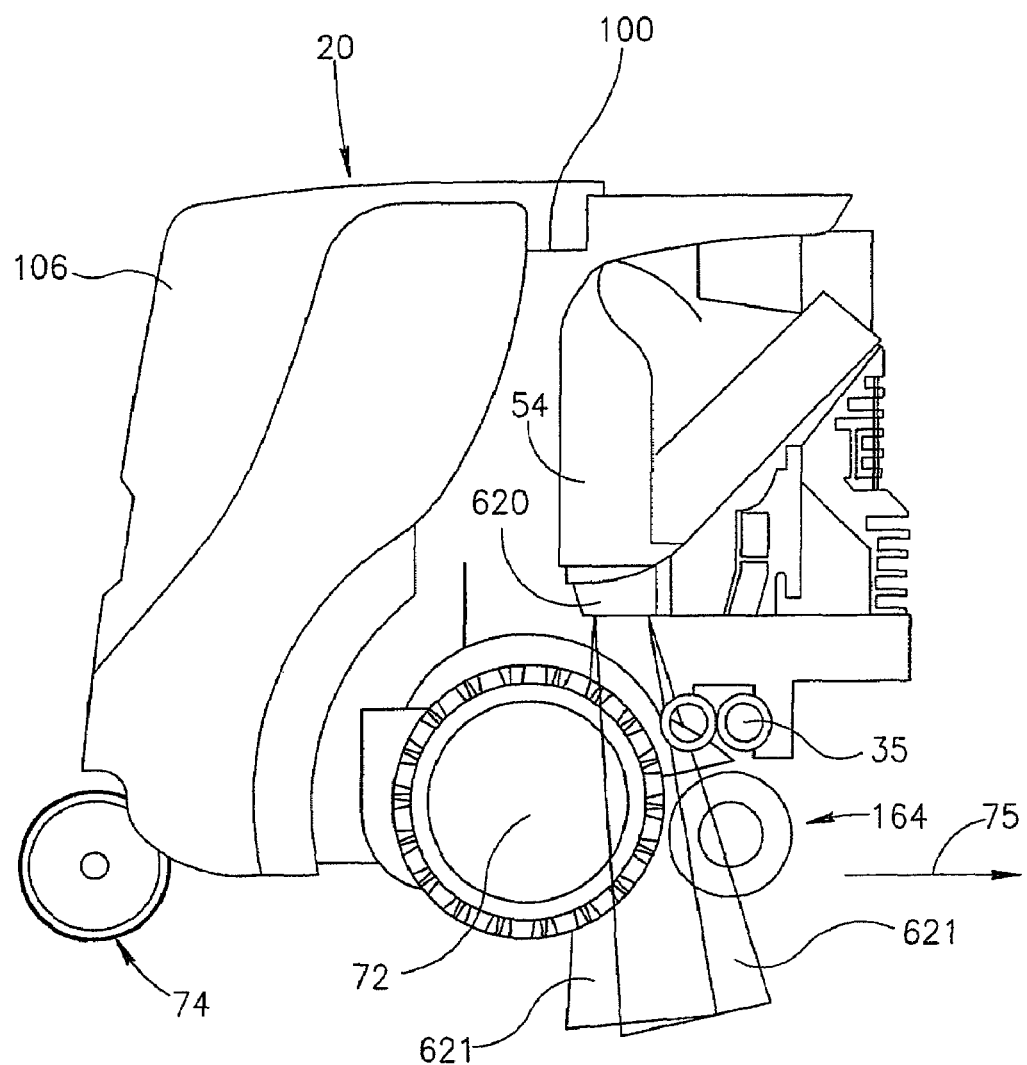
FIGS. 22A and 22B are diagrams of a stair sensing system in operation with the apparatus of the invention.
Figure 22B:
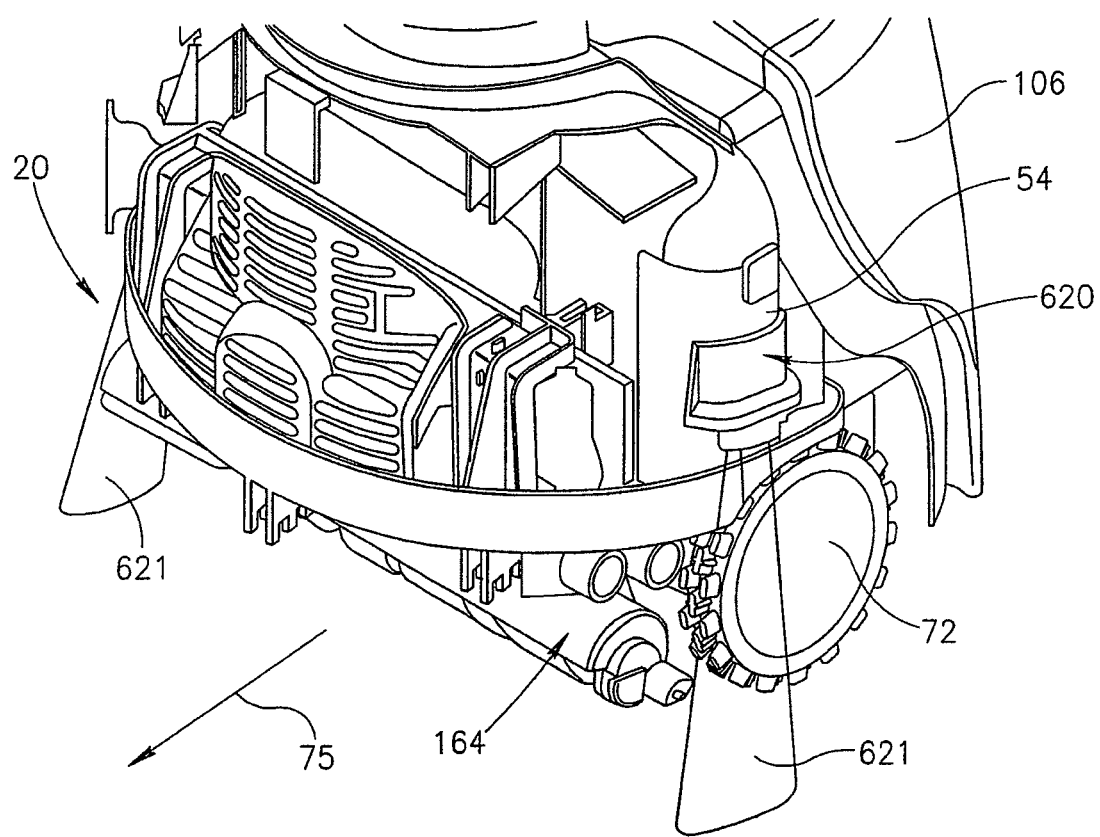

Turning to FIGS. 22A and 22B, sensors 620 (only one shown) (ranges of each sensor illustrated by beam projections 621), coupled to the control system 1000, are for detecting height variances, typically associated with stair detection. These sensors 620 are typically attached on opposite sides of the extending portion 54, that extends from the chassis 50. These sensors 620 are typically position sensing diodes (as detailed above). For example, the variance subject to detection would typically occur with stairs, that is about 3 cm from the surface on which the apparatus 20 rides. With this variance detected, the sensors 620 will signal the control system 1000, whereby the drive system 1040 will cease motion of the apparatus 20, as it was too close to stairs or other downward decline in the surface.

There is also a full bin sensor system 1020 (FIG. 23), formed of a transmitter 232 and receiver 233 positioned proximate to the filtration unit 148 (detailed above). This full bin sensor system 1020 is coupled to the control system 1000.

The remote control sensors 40 are typically infra-red (infrared or IR) sensors. They are coupled to the control system 1000, that accepts commands from the remote controller 46, transmitted in the form of infra-red light. They are positioned frontally and laterally in the apparatus 20 (FIGS. 1 and 13) to receive signals from the remote controller 46 regardless of the position of the apparatus 20.

The remote controller 46 is typically an infra-red (infrared or IR) remote controller (as detailed above) or the like. This remote controller 46 can signal directly to the control system 1000 (as the remote control sensor 40 is coupled to the control system 1000) various commands, such as ON/OFF, various travel modes, various cleaning modes and patterns, strengths of cleaning, speed of the apparatus, etc.

For example, the control system 1000 can be programmed to function in a cleaning mode and pattern, where upon being signaled, typically by the remote controller 46, the apparatus 20, will "spot clean." This involves small precise movements concentrated around a small area for cleaning this small area. This concentrated cleaning may involve high power suction by the apparatus 20 as it travels in small, typically overlapping, circles in a highly repetitious manner around this small area.

For example, the control system 1000 can be programmed to perform a travel mode, where once signaled, typically by the remote controller 46, and the signal is received by one of the remote control sensors 40, the apparatus 20 navigates its way to a point proximate the remote controller 46, from its present location. This is known as the "call me" function, and typically is a dedicated key on the remote controller 46, but could also be a code or the like. Navigation and movement to the point proximate the remote controller 46 can be wholly or partially in accordance with the sensors and associated systems and portions of the exemplary navigation program, detailed below (in blocks 1201-1244 of FIG. 24). Navigation back to the point proximate to the remote controller can also be partially or wholly by a beam riding mechanism, where the beam from the remote controller 46 is tracked by the control system 1000 and the apparatus 20 is rotated and maneuvered to the point proximate the remote controller 46.

FIG. 23 is a schematic diagram of the control system 1000 of the apparatus 20. The control system 1000 includes a main processing board 1002, that includes processing circuitry and other related circuitry, and a processor, such as a microprocessor (MP) 1004, that for example, serves as the central processing unit (CPU), for this main processing board 1002. The microprocessor 1004 is preprogrammed as well as having functionalities for receiving programs (typically entered through the remote controller 46 by the user). These programs may be for automatic or manual operation of the apparatus, or combinations thereof. The apparatus 20 can also include storage media (not shown), coupled to the control system 1000 or various components thereof. This storage media stores data, such as scanning patterns for cleaning, sound samples, mapping functions, travel modes, etc. This microprocessor 1004 can be, for example, a Hitachi H8S2350 processor.

The navigation system and remote control command processing are through the microprocessor 1004. Their functions, as well as others are directly integrated into the microprocessor 1004.

The control system 1000, and in particular the main processing board 1002 and accordingly, the microprocessor 1004, are coupled to various components and systems, as detailed below. All below-listed components and systems include the requisite associated electronics and electronic couplings in order for proper operation with the main processing board 1002 and microprocessor 1004. This control system 1000 controls power distribution to all systems and components as well as all operations thereof, for example, speeds, on/off, adjustments, positioning, etc. All components mentioned below, controlled by the control system 1000 include the requisite electronics, circuitry, couplings, etc., so as to define systems controlled by the main processing board 1002 and microprocessor 1004 of the control system 1000.

The user interface 25 is electronically coupled (with the requisite associated electronics) to the main processing board 1002, and accordingly, the microprocessor 1004. This main processing board 1002 (and accordingly the microprocessor 1004) is also coupled to the door detection sensors 30a, 30b, contour sensors 34, 35, obstacle sensors, 36a, 36b, 37, Infrared sensors, e.g., the sensor 38 and remote control sensor 40, the stair detection sensors 620, and the full bin sensing system 1020.

The main board 1002 and microprocessor 1004 are also coupled to the steering system 1030, that includes left 1032a and right 1032b drive motors and corresponding left 1034a and right 1034b odometers, associated with the respective drive wheels 72. This drive system 1040 also includes the angle sensing system 1042 and odometry system 1044 of the guide wheel 74. The navigation system also couples to these steering 1030 and drive 1040 systems through the main board 1002.

The main board 1002 and microprocessor 1004 also couple to a power system 1070, that include the batteries 86, and associated electronics, as well as the charging system 1074. The main board 1002 and microprocessor 1004 also control power to and thus, speed of the impeller motor 160 and agitator motor 308. There is also a coupling of the main board 1002/microprocessor 1004, with the "normally open" and "normally closed" electrical contacts defining the nozzle obstacle sensor system 1080 (detailed above). Similarly, there is a coupling of the main board 1002/microprocessor 1004 with the nozzle height adjustment system 560, including the nozzle height adjustment motor 566 and a nozzle height sensor 582, as well as the shock detection system 1082, in particular, the sensors associated therewith (detailed above).

Additionally, there is a coupling to the leash system 1084, that controls the leash 28 and associated components, that couples with the other systems, through the main board 1002/microprocessor 1004. The main board 1002/microprocessor 1004 can also couple to additional systems 1090, that include for example, supplemental proximity sensing systems, supplemental navigation systems, etc.

Figure 24A:
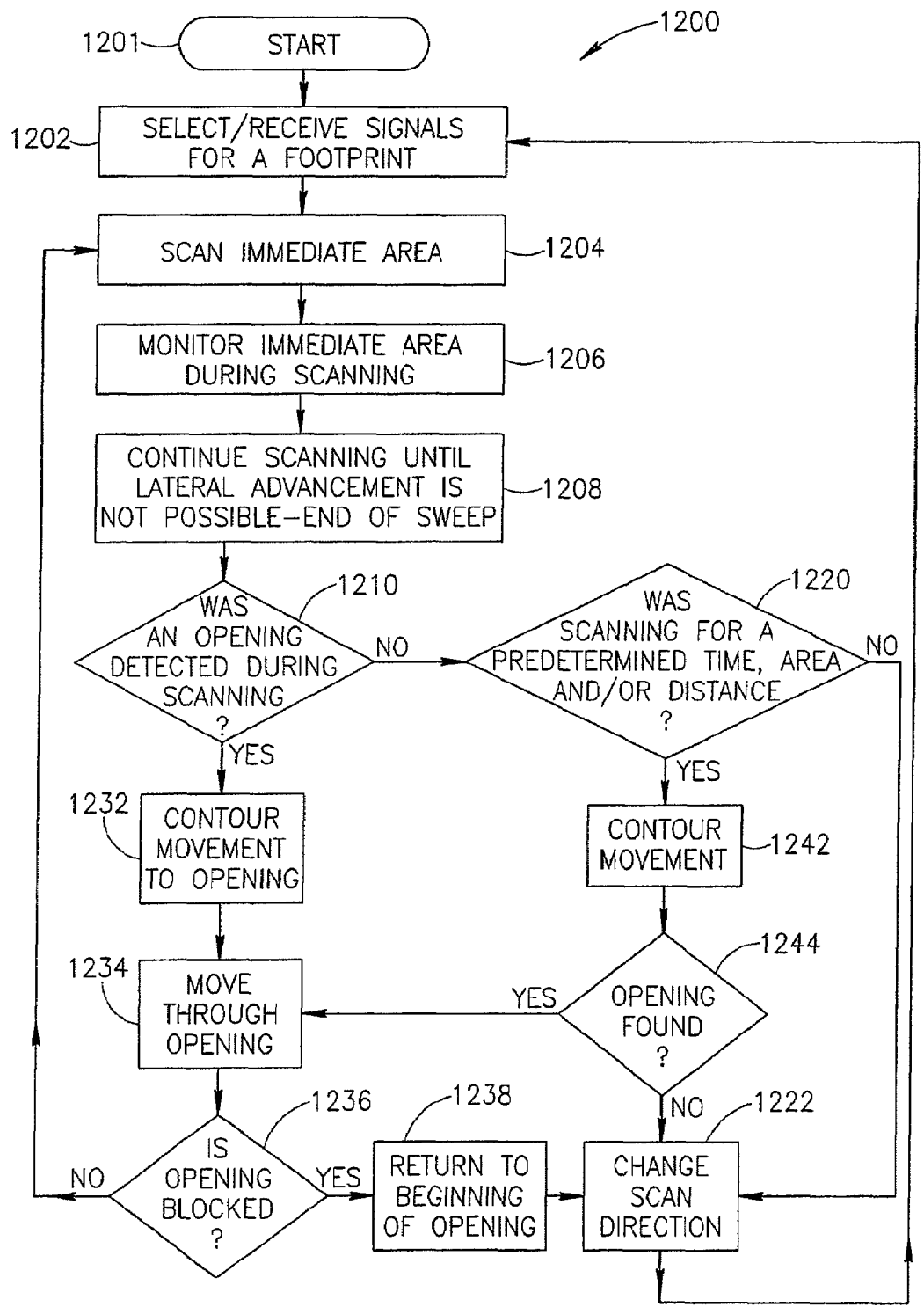
FIGS. 24A and 24B are flow diagrams of an example navigation process used by the apparatus of the invention.

FIG. 24A is a flow diagram indicating an example process of navigation and scanning for movement of the apparatus 20 for vacuum cleaning or the like. For example, this process 1200 can be implemented by the microprocessor 1004. It is typically preprogrammed therein, and coupled with the control system 1000 and main board 1002 will be performed by the apparatus 20.

Initially the process 1200 begins at a START, block 1201, typically by activating the apparatus. The control system 1000, via the microprocessor 1004 selects a footprint (path or scanning pattern) for the movement of the apparatus 20, at block 1202. The system always includes a default footprint. Alternately, this footprint can be selected by the user, with the signals corresponding to the desired footprint entered into the control system.

The control system 1000, via the microprocessor 1004, then signals the drive system 1040. This signal causes operation of the drive system 1040, where the apparatus 20 scans the immediate area in accordance with the selected footprint, at block 1204.

The "footprint" for scanning is the pattern of movement of the apparatus. This pattern is typically triangular, and in particular in isocelises triangles. It can also be rectangular in linear movements. Scanning patterns are typically designed so as to be substantially free of repetition. For example, scanning patterns may be as disclosed in commonly owned U.S. Pat. No. 6,255,793 and PCT Patent Application PCT/IL99/00248 (WO 99/59042), both of these documents incorporated by reference in their entirety herein.

The area being scanned is then monitored, at block 1206. Scanning continues until it is detected and signaled to the control system 1000, that the apparatus can no longer move laterally for scanning, at block 1208. At block 1208, the scanning is ended, or the "end of sweep" has been determined.

At this time, it is then determined, if an opening, suitable in size for the apparatus 20 to enter was detected during scanning (typically by contour sensors 34, 35, as shown in FIGS. 1 and 13), at block 1210. If an opening of suitable size was not detected during the scan, it is then determined if the apparatus 20 has scanned for a predetermined time, area and/or distance, or combination thereof, at block 1220. This is in accordance with predetermined policies, typically preprogrammed into the microprocessor 1004.

If the scanning did not satisfy the predetermined condition, the scan direction is changed, at block 1222. The process then returns to block 1202. Changing of the scanning direction, for example, can involve a turning movement of approximately 45 degrees by the apparatus 20, with scanning typically employing the same footprint, as was determined at block 1202. Other turning angles are also permissible, and can be programmed or entered into the control system 1000, for example, through the remote controller 46.

Returning to block 1210, if an opening was found, a contour movement to the opening is signaled at block 1232. This contour movement involves the apparatus 20 moving along the sides or periphery (typically defined by the walls of the room or area), or proximate thereto (collectively, the "contour"), of the scanned area to look for the opening, as detected by the contour sensors 34, 35 (detailed above). Initially, if necessary, prior to the contour movement (based on the position of the apparatus 20 upon reaching the end of sweep), the apparatus 20 moves to a point along or proximate the sides or periphery from where the contour movement (to the opening) will begin. Once the opening is reached, the apparatus 20 is signaled (from the control system 1000) to enter and move through the opening, at block 1234, by sensing the contour (by contour sensors 34, 35) and following it to the next area to be cleaned (scanned). It is then determined if the opening is blocked, at block 1236. If the opening is not blocked, the process returns to block 1204.

If the opening is blocked, the apparatus 20 is driven to return to the beginning of the opening at block 1238, where the scanning direction is changed, as the process returns to block 1222. With the scanning direction changed, the process returns to block 1202.

Returning to block 1220, if scanning satisfies the predetermined parameters, a contour movement is signaled, at block 1242. This contour movement involves the apparatus 20 moving along the sides, periphery or proximate thereto, of the scanned area (typically defined by the walls of the room or area) to look for an opening, suitable for passage of the apparatus therethrough, at block 1244.

If an opening is found, the apparatus 20 is signaled (from the control system 1000) to enter and move through the opening, at block 1234. The process continues from this point (block 1234) as detailed above.

If an opening was not found at block 1244, typically in a predetermined time period or scanned distance traveled (as for example, preprogrammed into the control system 1000), the process moves to block 1222, where the scan direction is changed, as detailed above. The process then returns to block 1202, as detailed above.

Alternately, the contour movements in blocks 1232 and 1242 can be replaced with point to point navigation, as detailed above. The determination as to whether to make a contour movement or point to point navigation can be programmed into the microprocessor 1004.

The above process 1200 repeats for as long as necessary, typically until a time out, power outage or deactivation (turned OFF) by the user.

Figure 24B:
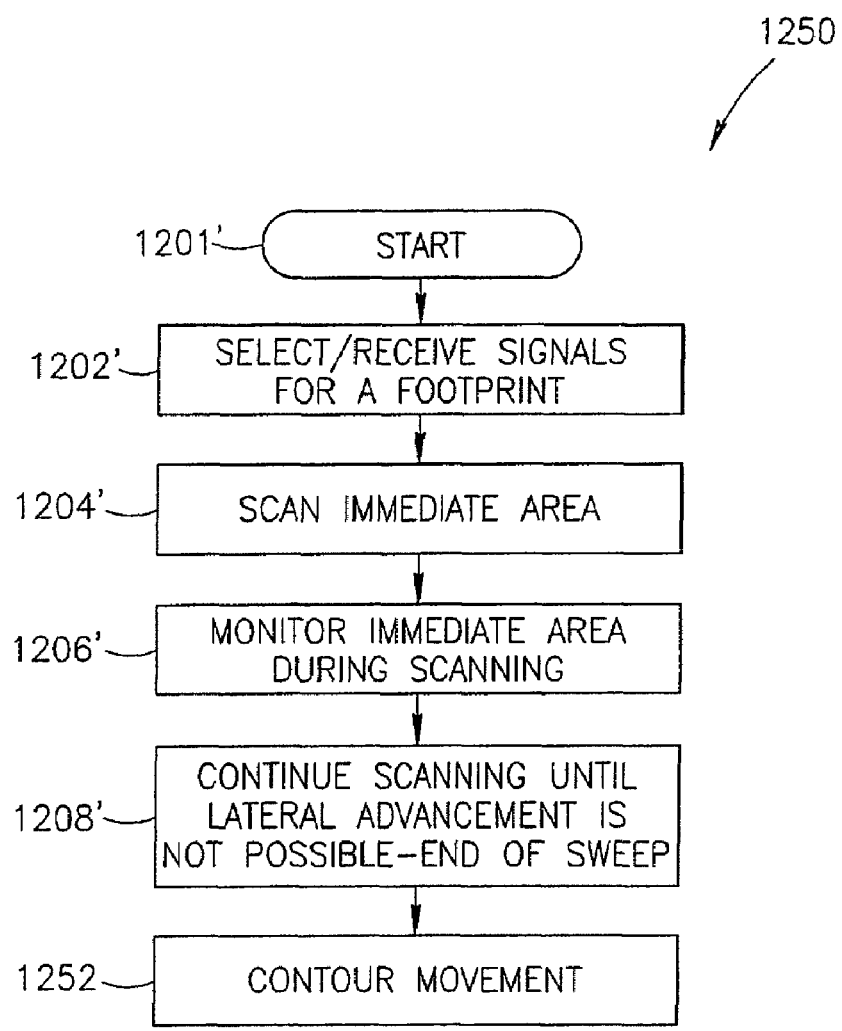

FIG. 24B is a flow diagram indicating another example process of navigation and scanning for movement of the apparatus 20 for vacuum cleaning or the like. For example, this process 1250 can be implemented by the microprocessor 1004. It is typically preprogrammed therein, and coupled with the control system 1000 and main board 1002 will be performed by the apparatus 20.

Here, blocks 1201', 1202', 1204', 1206' and 1208' are similar to corresponding blocks 1201, 1202, 1204, 1206 and 1208, that have been described above, those descriptions applicable here.

Once block 1208' is complete, as lateral advancement for the apparatus 20 is no longer possible, here, the apparatus 20 having reached the end of sweep, the process moves to block 1252. In block 1252, there is performed a contour movement in accordance with the contour movements detailed above. Additionally, if necessary, prior to the contour movement (based on the position of the apparatus 20 upon reaching the end of sweep), the apparatus 20 moves to a point along or proximate the sides or periphery from where the contour movement will begin.

This contour movement can be for a predetermined or preset distance. In this case, once the apparatus 20 has moved the predetermined distance of the contour movement, the process returns to block 1201', whereby scanning of an area or portion thereof begins again. The process repeats for as long as necessary, typically until a time out, power outage or deactivation (turned OFF) by the user.

Alternately, this contour movement of block 1252, in particular its length or distance to be traveled "D", can be determined "on the fly" or dynamically, based on an estimate of the circumference or perimeter of the room, area, or portion thereof, to be or being scanned, in accordance with following formula:

$$D = [K_1 \bullet d]/[\Sigma L_i / \max\{L_i\}] + [K_2 \bullet \max\{L_i\}]$$

where, $L_i$ is the series $L_1$ to $L_n$, and $L_1$ to $L_n$ are the lengths of each straight line portion of the scanned pattern;

$K_1$ and $K_2$ can be, for example, $K_1 = 0.8$, $K_2 = 1$, where $L_i$ are measured in meters; and d is the diameter of the apparatus, for example, apparatus 20, expressed in meters.

In accordance with the processes detailed in FIGS. 24A and 24B, the microprocessor 1004 is also programmed for all of the above detailed cleaning and travel modes and combinations thereof. The microprocessor 1004 operates in conjunction with the main board 1002 and control system 1000, for all of these additional cleaning and travel modes. The microprocessor 1004 is also programmed to determine distances traveled for odometers of the drive 72 and support 74 wheels.

Turning to FIG. 25, there is detailed another function of the invention. Here the apparatus 20 can be confined to specific areas, by the placement of one or more coded transmitters 1300 at various locations in a room. The transmitter 1300 functions as a "virtual" wall.

Here, the apparatus is operating in a room 1302. It is desired to keep the apparatus 20 in room portion QQ, and not let it travel to room portion RR (separated by broken line 1304 for emphasis only). Accordingly, coded transmitter 1300 is positioned such that its "IN" beam 1308 is on the QQ side of the room 1302, while the "OUT" beam 1309 is on the RR side of the room 1302. Both of these beams 1308 and 1309 are typically of IR light so as to be detectable by the sensors 40. Once detected, signals are sent from the sensors 40 to the control system 1000, that processes these signals and controls the drive system 1040 to maintain the apparatus 20 in the proper portion of the room, here portion QQ.

While an autonomous robot or machine that functions as a vacuum cleaner has been shown and described above, this is exemplary only. The above-disclosed subject matter can also be applied with and adapted for other robots or autonomous machines, that perform various tasks, including cleaning, sweeping, polishing, lawnmowing, gardening, earthmoving, etc.

The methods and apparatus disclosed herein have been described with exemplary reference to specific hardware and/or software. The methods have been described as exemplary, whereby specific steps and their order can be omitted and/or changed by persons of ordinary skill in the art to reduce embodiments of the present invention to practice without undue experimentation. The methods and apparatus have been described in a manner sufficient to enable persons of ordinary skill in the art to readily adapt other commercially available hardware and software as may be needed to reduce any of the embodiments of the present invention to practice without undue experimentation and using conventional techniques.

While preferred embodiments of the present invention have been described, so as to enable one of skill in the art to practice the present invention, the preceding description is intended to be exemplary only. Moreover, the embodiments and components thereof are exemplary. This description should not be used to limit the scope of the invention, which should be determined by reference to the following claims.

What is claimed is:

1. A nozzle for suction of particulates comprising:
   a body, said body including a first end and a second end, said first end including a neck, and said second end including an upper edge and a lower edge defining an opening therebetween; and,
   a lip extending at least substantially parallel to said opening along said upper edge and extending at least partially beyond said lower edge of said second end, said lip tapering upward from a portion of greater thickness to portions of lesser thickness, said lip configured for creating a flow cavity to be formed with a floor or surface over which said nozzle traverses.

2. The nozzle of claim 1, wherein said lip is rounded in cross sectional shape.

3. The nozzle of claim 1, wherein said lip and said opening define a constant vertical aperture.

4. The nozzle of claim 1, wherein said upper edge is along a first plane and said lower edge is along a second plane, said first and second planes at least substantially parallel with respect to each other.

5. The nozzle of claim 1, wherein said body includes outwardly tapered sides, said outward tapering extending from said neck.

6. An obstacle detection system for an autonomous cleaning machine comprising:
   a control system;
   a nozzle, said nozzle including a first end for receiving particulate inflow, and a second end for communicating with a suction generating unit, said second end including arms;
   a height adjustment system coupled to said first end of said nozzle, said height adjustment system in communication with said control system;
   receiver portions configured for receiving said arms in a pivotal engagement, at least one of said arms and a respective receiver portion including first electrically conducting portions in electronic communication with said control system; and
   at least one of said arms mounted in said respective receiver portion so as to define an open circuit when said at least one arm is at a first position in said respective receiver portion, where said first electrically conducting portions are out of contact with each other, and, defining a closed circuit when said at least one arm is at a second position in said respective receiver portion, where said first electrically conducting portions are in contact with each other.

7. The obstacle detection system of claim 6, additionally comprising a biasing member in communication with said at least one arm and said respective receiver portion for maintaining said at least one arm in said first position.

8. The obstacle detection system of claim 7, wherein said biasing member includes a spring.

9. The obstacle detection system of claim 7, additionally comprising:
   second electrically conducting portions on said at least one arm and said respective receiver portion, said second electrically conducting portions in communication with said control system; and
   said at least one arm mounted in said respective receiver portion so as to define a closed circuit when said at least one arm is at said first position in said respective receiver portion, where said second electrically conducting portions are in contact with each other, and, defining an open circuit when said at least one arm is at said second position, where said second electrically conducting portions are out of contact with each other.

10. The obstacle detection system of claim 9, wherein said control system is configured to signal said height adjustment system upon the detection of either of:
    said closed circuit between said first electrically conducting portions; or
    said open circuit between said second electrically conducting portions.

11. An obstacle detection system for an autonomous cleaning machine comprising:
    a control system;
    a nozzle, said nozzle including a first end for receiving particulate inflow, and a second end for communicating with a suction generating unit, said second end including arms;
    a height adjustment system coupled to said first end of said nozzle, said height adjustment system in communication with said control system;
    receiver portions configured for receiving said arms in a pivotal engagement, at least one of said arms and a respective receiver portion including first electrically conducting portions in electronic communication with said control system; and
    at least one of said arms mounted in said respective receiver portion so as to define a closed circuit when said at least one arm is at a first position in said respective receiver portion, where said first electrically conducting portions are in contact with each other, and, defining an open circuit when said at least one arm is at a second position in said respective receiver portion, where said first electrically conducting portions are out of contact with each other.

12. The obstacle detection system of claim 11, additionally comprising a biasing member in communication with said at least one arm and said respective receiver portion for maintaining said at least one arm in said first position.

13. The obstacle detection system of claim 12, wherein said biasing member includes a spring.

14. The obstacle detection system of claim 12, additionally comprising:
    second electrically conducting portions on said at least one arm and said respective receiver portion, said second electrically conducting portions in communication with said control system; and
    said at least one arm mounted in said respective receiver portion so as to define an open circuit when said at least one arm is at said first position in said respective receiver portion, where said second electrically conducting portions are out of contact with each other, and, defining a closed circuit when said at least one arm is at said second position in said respective receiver portion, where said second electrically conducting portions are in contact with each other.

15. The obstacle detection system of claim 14, wherein said control system is configured to signal said height adjustment system upon the detection of either of:
    said open circuit between said first electrically conducting portions; or
    said closed circuit between said second electrically conducting portions.

* * * * *